United States Patent Office 3,647,800
Patented Mar. 7, 1972

3,647,800
10-SUBSTITUTED - 1,2,3,4 - TETRAHYDROBENZO [b][1,6]NAPHTHYRIDINES USEFUL AS CNS DEPRESSANTS
Milton Wolf, West Chester, and James L. Diebold, Havertown, Pa., assignors to American Home Products Corporation, New York, N.Y.
No Drawing. Division of application Ser. No. 760,063, Sept. 16, 1968, now Patent No. 3,580,915, dated May 25, 1971, which is a continuation-in-part of applications Ser. No. 533,793 and Ser. No. 533,802, both Mar. 14, 1966, and Ser. No. 581,756, Sept. 22, 1966. Divided and this application Apr. 30, 1970, Ser. No. 33,511
Int. Cl. C07d 39/00
U.S. Cl. 260—287 R
5 Claims

ABSTRACT OF THE DISCLOSURE

This invention concerns 1,2,3,4 - tetrahydrobenzo[b]-[1,6]naphthyridines, 1,2,3,4,4a,5,10,10a-octahydrobenzo-[b][1,6]naphthyridines and the pharmacologically acceptable acid addition salts thereof which are pharmacologically active as central nervous system depressants which are useful in producing a calming effect in warm-blooded animals. Further, this invention concerns a process for the preparation of 10 - amino-1,2,3,4-tetrahydrobenzo-[b][1,6]naphthyridines.

This application is a division of United States patent application Ser. No. 760,063, entitled "1,2,3,4-Tetrahydrobenzo[b][1,6]Naphthyridine Derivatives," filed on Sept. 16, 1968 by Milton Wolf and James L. Diebold, now U.S. 3,580,915, which in turn is a continuation-in-part of now abandoned United States pat. applications Ser. No. 533,802, entitled "10 - Aminobenzo[b][1,6]Naphthyridines," filed on Mar. 14, 1966, by Milton Wolf; Ser. No. 533,793, entitled "1,2,3,4 - Tetrahydrobenzo[b][1,6]-Naphthyridine Derivatives," filed on Mar. 14, 1966 by Milton Wolf and James L. Diebold; and Ser. No. 581,756, entitled "1,2,3,4 - Tetrahydrobenzo[b][1,6]Naphthyridine Derivatives," filed Sept. 22, 1966 by Milton Wolf and James L. Diebold.

This invention is directed to novel compounds classified in the art of organic chemistry as benzonaphthyridines and to a process for making some of these compounds. More particularly, the present invention is concerned with 1,2,3,4 - tetrahydrobenzo[b][1,6]naphthyridines and 1,2,3,4,4a,5,10,10a - octahydrobenzo[b][1,6]naphthylridine derivatives which in standard and accepted pharmacological tests have demonstrated central nervous system depressant activity which is useful in producing a calming effect in warm-blooded animals.

In its composition aspect, the claimed invention resides in a composition of matter having a tetrahydro or a octahydrobenzo[b][1,6]naphthyridine substituted nucleus. These compounds are exemplified by the following formulae:

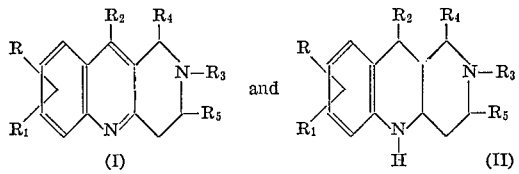

wherein R and R₁ are selected from the group consisting of hydrogen, halogen, nitro, lower alkyl, lower alkoxy, lower alkylthio, lower alkylsufonyl, carbamoyl, sulfamoyl, and trifluoromethyl; R₂ is selected from the group consisting of hydrazino, amino, aminoanilino, anilino, di(lower)-alkylamino(lower)alkylamino, amino(lower)alkylthio, phenyl, sulfamylphenyl, carboxphenyl, phenylhydrazino, halophenyl, lower alkylphenyl, lower alkexyphenyl, lower alkylthiephenyl, phenexy, phenthio, morpholino, pyridyl, thienyl, and furyl, 4-alkyl-1-piperzinyl; and R₃ is selected from the group consisting of hydrogen, amidino, lower alkyl, di(lower)alkyl, phenyl, lower alkylpheny, halophenyl, phen(lower)alkyl, benzoyl, lower alkanoyl, halo-(lower)alkanoyl, dihalo(lower)alkanoyl, lower alkanoyloxy, di(lower)alkylamino(lower)alkanoyl, lower akylsulfonyl, phenylsulfonyl, lower alkylcarbamoyl, lower alkoxy(lower)alkyl, di(lower) alkylamino(lower)alkyl, dihydroxy(lower)alkyl and 5,5 - dimethyl-3-oxo-1-cyclohexen-1-yl; R₄ and R₅ when taken separately are both selected from the group consisting of hydrogen, dimethyl, lower alkyl, phenyl, halophenyl, lower alkylphenyl, lower alkoxyphenyl and phen(lower)alkyl, and when R₄ and R₅ are concatenated they form an ethano bridge; and the pharmacologically acceptable acid addition salts thereof. As employed herein the terms "lower alkyl," "lower alkoxy," "lower alkanoyl" and the like are meant to include both branched and straight chain hydrocarbon moieties having from about one to about six carbon atoms.

The compounds of the present invention possess the inherent physical properties of being relatively high melting yellowish to colorless solids, and substantially insoluble in water. Examination of these compounds produced by the hereinafter described processes reveals data confirming the molecular structures hereinbefore set forth. The aforementioned physical characteristics, taken together with the nature of the starting materials and the mode of synthesis positively confirm the structure of the compounds of this invention.

The new and novel compounds of the above Formula I properly are called "tetrahydrobenzonaphthyridines." Typical examples thereof are: 8-chloro-1,2,3,4-tetrahydro-2-methyl-10-phenylbenzo[b][1,6]naphthyridine and 2-benzyl - 8 - chloro - 1,2,3,4 - tetrahydro - 10 - phenylbenzo[b][1,6]naphthyridine. The compounds of the present invention of Formula I wherein R₂ is amino, aminoanilino, anilino, hydrozino and phenylhydrazino may exist in two forms, as shown in by following tautomeric structures:

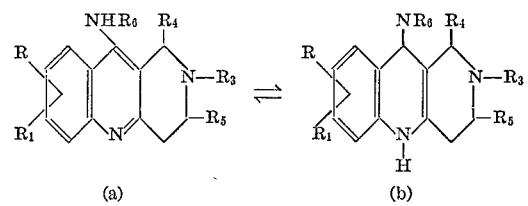

(a)                   (b)

wherein R, R₁, R₃, R₄ and R₅ are defined as above; and R₆ is selected from the group consisting of hydrogen, aminophenyl, phenyl, amino and phenylamino. For the purpose of simplicity these tautomers (a) and (b) shall hereinafter be designated and named as the 10-position amino compounds of Formula (a), for example: 10-amino - 1,2,3,4 - tetrahydro - 2 - methylbenzo[b][1,6] naphthyridine; 10-(o-aminoanilino) - 7 - chloro - 1,2,3,4-tetrahydro - 2 - methylbenzo[b][1,6]naphthyridine; 10-anilino-8-chloro - 1,2,3,4 - tetrahydro - 2 - methylbenzo[b][1,6]naphthyridine; (8 - chloro-1,2,3,4-tetrahydro-2-methylbenzo[b][1,6]naphthyridin - 10 - yl)hydrazine; and 1-(7-chloro - 1,2,3,4 - tetrahydro - 2 - methylbenzo[b][1,6]naphthyridin - 10 - yl) - 2-phenylhydrazine. It should be understood, however, that the present invention also encompasses and includes the corresponding 10-position imino compounds of Formula b. When the compounds of this invention are represented by the Formula II they are designated "octahydrobenzonaphthyridines," such as: 2 - benzyl - 8 - chloro - 1,2,3,4,4a,5,10,10a-octahydrobenzonaphthyridine and 8 - chloro-1,2,3,4,4a,5,10, 10a - octahydro - 2 - methyl - 10 - phenylbenzo[b][1,6] naphthyridine.

Some of the tetrahydrobenzonaphthyridines of the present invention may be prepared by the interaction of a o-aminocarbonyl compound with a 4-piperidone. This first process is further elucidated in the following reaction scheme:

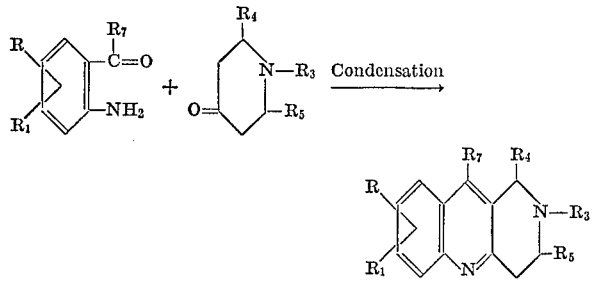

wherein R, $R_1$, $R_3$, $R_4$ and $R_5$ are defined as above, and $R_7$ is selected from the group consisting of phenyl, sulfamylphenyl, carboxyphenyl, halophenyl, lower alkylphenyl, lower alkoxyphenyl, lower alkylthiophenyl, pyridyl, thienyl, and furyl. This reaction is conducted in the presence of a strong acid at a temperature from about 70° C. to about 210° C. for a period of about fifteen minutes to about four hours. Preferably, this invention is conducted in polyphosphoric or trifluoroacetic acid. When the reaction is complete, the reaction mixture is cooled and then admixed with an ice-water mixture. The resulting solution is then filtered and made basic to separate the appropriate tetrahydrobenzonaphthyridine.

Alternatively, the above-defined tetrahydrobenzonaphthyridines may be prepared by heating the reactants to fusion with the passage of hydrogen chloric gas through the melt. This operation results in an exothermic reaction accompanied by the evolution of water. To complete the reaction the reaction mixture is again heated up to about 200–210° C. The reaction mixture is then cooled, triturated with an alkanol and the product recovered as the hydrochloride salt by conventional means.

In accord with the new and novel process of the present invention, the 10-aminotetrahydrobenzonaphthyridines of this invention may be prepared by the reaction of a 2-aminobenzonitrile with an appropriate 4-piperidone. This second process is exemplified by the following reaction scheme:

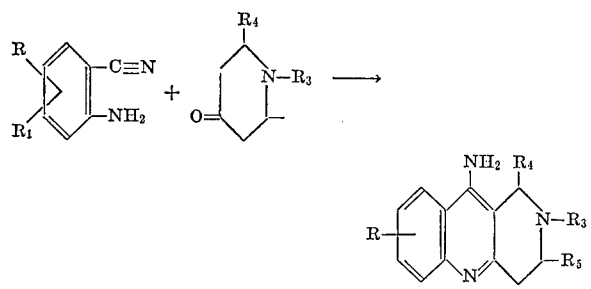

wherein R, $R_1$, $R_3$, $R_4$ and $R_5$ are defined as above. The reaction is effected by heating a substantially equimolar mixture of the reactants, in the presence fo a strong acid, at a temperature from about 140° C. to about 200° C. for a period of from about one-half hour to two hours. Preferably, this reaction is conducted in polyphosphoric acid at about 150° C. for about one hour. By strong acid as employed in these first two processes is meant any organic or inorganic acid which dissolves the reactants and does not interfere with their interaction. Although many such acids may be employed, as will suggest themselves to those skilled in the art, excellent results have been obtained with polyphosphoric, trifluoroacetic, acetic and alkanesulfonic and arylsulfonic acids, for example, benzenesulfonic, and toluenesulfonic acid, methylsulfonic acid and ethylsulfonic acid.

After the reaction is complete, the reaction mixture is cooled and basified with an aqueous alkaline solution, for example, sodium hydroxide, potassium hydroxide, sodium bicarbonate and sodium carbontae. Thereafter, the 10-aminotetrahydrobenzonaphthyridine is obtained by conventional methods such as filtration and crystallization from a suitable solvent.

The other tetrahydrobenzonaphthyridines of this invention may be prepared by a third process which is depicted by the following reaction scheme:

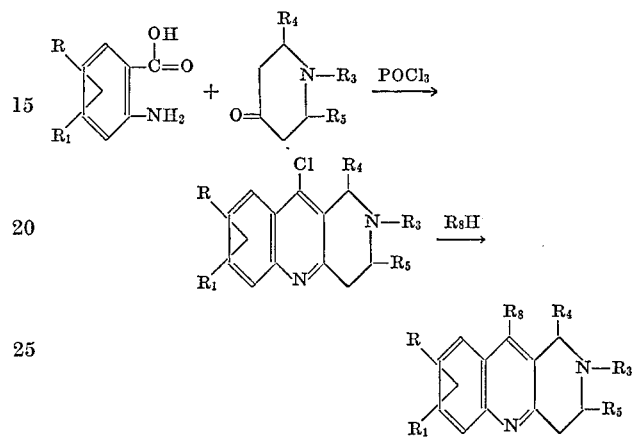

wherein R, $R_1$, $R_3$, $R_4$ and $R_5$ are defined as above, and $R_8$ is selected from the group consisting of aminoanilino, anilino, di(lower)alkylamino(lower)alkylamino, phenoxy, morpholino, 4 - alkyl - 1 - piperazinyl, phenthio, amino(lower)alkylthio, hydrazino and phenylhydrazino. The 10-chlorotetrahydronaphthyridine intermediates are prepared by the interaction of an anthranilic acid, an appropriate 4-piperidone and phosphorus oxychloride at about the reflux temperature of the reaction mixture for a period of about one to about four hours. The reaction mixture is then evaporated, the residue dissolved in a water-immiscible organic solvent, e.g. methylene chloride which is then added to a cold aqueous alkaline solution, e.g. ammonium hydroxide. Thereafter, the 10-chlorotetrahydrobenzonaphthyridine intermediate is separated by standard procedures, e.g. the water layer is washed, dried and evaporated to afford the intermediate which may be further purified by crystallization from a suitable solvent, e.g. a liquid alkane.

The tetrahydrobenzonaphthyridine of this invention wherein $R_8$ is aminoanilino, anilino, di(lower)alkylamino (lower)alkylamino, phenoxy, morpholino and 4-alkyl-1-piperazinyl are prepared by the condensation of an above-prepared 10-chlorotetrahydrobenzonaphthyridine intermediate with an appropriate proton donor reactant, e.g. aminoaniline, aniline, a di(lower)alkylamino(lower) alkylamine; phenol and morpholine. The reaction is effected by admixing a 10-chlorotetrahydrobenzonaphthyridine with phenol and heating the resulting mixture, under an inert atmosphere e.g. nitrogen, to about 100° C. for a period of about fifteen to about thirty minutes. Thereafter, the proton donor reactant is slowly added and the reaction mixture is then heated to about reflux temperatures for a period of about five to about eight hours. When the reaction is complete, the resulting product is recovered by standard procedures, e.g. the product is dissolved in a water-immiscible organic solvent e.g. methylene chloride, extracted with an aqueous alkali metal hydroxide solution, dried, evaporated to dryness and the residue is then recrystallized from a suitable solvent e.g. benzene.

The tetrahydrobenzonaphthyridines of this invention wherein $R_8$ is arylthio and alkylthio, e.g. phenthio and amino(lower)alkylthio are prepared by the condensation of an above-prepared 10-chlorotetrahydrobenzonaphthyridine with an appropriate mercaptan reactant, e.g. phenyl mercaptan and an amino(lower)alkyl mercaptan. The reaction is effected by admixing a 10-chlorotetrahydrobenzonaphthyridine, an appropriate mercaptan, and from about one to about two molar excess of an aqueous alkali metal hydroxide solution in an alkanol and then heating the resulting mixture to about reflux temperatures for a period of about one to about three hours. When the reaction is complete, the product, a 10-thiotetrahydrobenzonaphthyridine, is separated by conventional recovery methods. For example, the reaction mixture is evaporated to dryness, the residue dissolved in a water-immiscible organic solvent, e.g. methylene chloride, this organic layer is then evaporated to dryness and the residue is recrystallized from an appropriate solvent e.g. hexane. The 10-arylthiotetrahydronaphthyridines may also be prepared by the condensation reaction described in hereinafter Example LVIII.

The tetrahydrobenzonaphthyridines of this invention wherein $R_8$ is hydrazino and phenylhydrazino are prepared by the condensation of an above prepared 10-chlorotetrahydrobenzonaphthyridine with an appropriate hydrazine this reaction is conducted in an alkanol at about reflux temperatures for a period of about one to about eight hours. Thereafter, the resulting product, a tetrahydrobenzonaphthyridinyl hydrazine, is separated by standard procedures, as exemplified in hereinafter Examples LX–LXI.

The above-described 2-lower alkanoyloxy tetrahydrobenzonaphthyridines, the 2-halo(lower)alkanoyl tetrahydrobenzonaphthyridines, the 2-amidino tetrahydrobenzonapthyridines the 2-dihydroxy(lower)alkyl tetrahydrobenzonaphthyridines, the 2-di(lower)alkaylamino(lower) alkanoyl tetrahydrobenzonaphthyridines, and the 2-dihalo(lower)alkanoyl tetrahydrobenzonaphthyridines may also be prepared by the procedures described in detail in the hereinafter listed Examples XIX to XXV.

The octahydrobenzonaphthyridine compounds of the present invention are prepared by the hydrogenation of their corresponding above prepared tetrahydrobenzonaphthyridine, as exemplified by the following reaction:

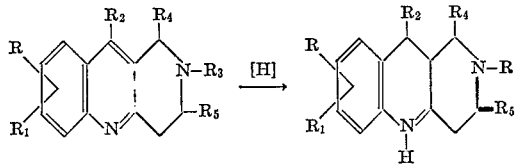

wherein R, $R_1$, $R_2$, $R_3$, $R_4$ and $R_5$ are defined as above. Although various reduction procedures may be employed, a preferred method to effect this conversion is the use of a reducing agent such as hydrogen gas. Utilizing this preferred method, a tetrahydrobenzonaphthyridine is admixed with glacial acetic acid and platinum oxide at about 30° C., under a hydrogen pressure of about 50 p.s.i., for a period of about twenty-four hours. Thereafter, the product is separated by evaporation of the excess acetic acid and the residue is dissolved in water, basified and recrystallized to yield the appropriate octahydrobenzonaphthyridine.

As is evident from the above-described methods of producing the tetrahydrobenzonaphthyridine and octahydrobenzonaphthyridine compounds of this invention, these compounds can be recovered either in the form of their acid addition salts or as the free bases. These tetrahydrobenzonaphthyridine and octahydrobenzonaphthyridine bases can be converted to their acid addition salts by reacting them with the usual acids, e.g. hydrochloric, hydrobromic, hydroiodic, sulfuric and phosphoric or with an organic acid, for example, citric, acetic, benzoic, methanesulfonic or p-toluenesulfonic. While the free bases have the same pharmacological properties as their acid addition salts, they are more often utilized in the preparation of such salts rather than directly for their pharmacological effects.

In accord with the present invention, the new and novel tetrahydrobenzonaphthyridine and octahydrobenzonaphthyridine compounds of this invention have been found to possess interesting pharmacological properties. More particularly, these compounds, in standard pharmacological tests, have exhibited utility as central nervous system depressants which are useful in producing a calming effect, particularly in laboratory and domestic animals.

In the pharmacological evaluation of the central nervous system depressant compounds of this invention the in vivo effects of the compounds of this invention are tested as follows:

The compound is administered orally as a 1% suspension emulsified with polyethylene oxide sorbitan monooleate to three mice (14 to 24 grams) at each of the following doses: 400, 127, 40, 12.7 and 4.0 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated for their Sedative-Ataxic Score by use of a pole climb and inclined screen for the presence of sedationataxia [Kouzmanoff et al., J. Pharm. Exp. Ther. 144, 40A (1958)]. The "Eddy Hot-Plat method" [Nathan B. Eddy and Dorothy Leimbach, Jr., Pharmacol. Exper. Therap., 107, 385 (1953)] is used to test for analgesia. The experiment is terminated by subjecting each animal to a maximal electroshock to test for anticonvulsant activity.

The tetrahydrobenzonaphthyridine and octahydrobenzonaphthyridine compound of this invention in the above test procedure produce decreased motor activity when administered at a dosage range from 12.7 to 400 mg./kg.; produce decreased respiration when administered at a dosage range from 40 to 400 mg./kg. and rate a sedative-ataxic score of 1–2 when administered at a dosage range from 40 to 400 mg./kg. There were no deaths at the highest dose used, 400 mg./kg.

When the tetrahydrobenzonaphthyridine and octahydrobenzonaphthyridine compounds of this invention are employed as central nervous system depressants to produce a calming effect in warm-blooded animals, e.g., mice, rats, rabbits, dogs, cats, monkeys, etc. they may be administered alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of the present tetrahydrobenzonaphthyridine and octahydrobenzonaphthyridine compounds when employed as central nervous system depressant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Further, it has been surprisingly found that 8-chloro-1,2,3,4 - tetrahydro - 1,1,3,3-tetramethyl-10-phenylbenzo [b][1,6]naphthyridine and 8-chloro-1,2,3,4-tetrahydro-10- phenylbenzo[b][1,6]naphthyridine of the present invention also possess valuable amedicidal activity. In particular, when tested in standard in vitro screening procedures these two compounds have demonstrated anti-amebic activity, especially against *Endameba histolytica* and are, therefore, useful as anti-amebic agents.

In the amebicidal evaluation of these two compounds of this invention, the test compound is incorporated and diluted in the aqueous phase of Boeck-Drbohlav diphasic medium fortified with rice starch. The medium is inoculated with polybacteria and a known number of trophozoites of *E. histolytica* NIH 200. After forty-eight hours incubation at 35° C., the trophozoites are counted. The procedure is derived from Thompson et al., Antibo. and Chemo., 6, 337–50 (1956). The endpoint is expressed as the percent of *E. histolytica* killed at a particular concentration ($\mu$g./ml.) of test compound. In this test, 8-chloro-1,2,3,4-tetrahydro - 1,1,3,3 - tetramethyl - 10 - phenylbenzo[b][1,6]naphthyridine averaged about a percent kill of *E. histolytica* at a concentration of $\mu$g./ml. and 8-chloro - 1,2,3,4 - tetrahydro - 10 - phenylbenzo[b][1,6]naphthyridine averaged about a 100 percent kill of *E. histolytica* at a concentration of about 5 $\mu$g./ml.

The anti-amebic activity of these two compounds of this invention can be utilized for washing equipment in hospitals and homes, instruments used in medicine and bacteriology, clothing used in bacteriological laboratories, and floors, walls, and ceiling in rooms in which a background free of *E. histolytica* is desired.

Still further, it has been unexpectedly found that 8-chloro-1,2,3,4-tetrahydro-1,1,3,3-tetrahydromethyl-10-phenylbenzo[b][1,6]naphthyridine;
8-chloro-1,2,3,4-tetrahydro-2-phenethyl-10-phenyl-benzo[b][1,6]naphthyridine;
8-chloro-1,2,3,4-tetrahydro-2-methyl-10-phenyl-1,3-ethanobenzo[b][1,6]naphthyridine;
1,2,3,4-tetrahydro-1,1,3,3-tetramethyl-10-(p-tolyl)benzo[b][1,6]naphthyridine;
6-chloro-1,2,3,4-tetrahydro-1,1,3,3-tetramethyl-10-phenylbenzo[b][1,6]naphthyridine;
7-chloro-1,2,3,4-tetrahydro-1,1,3,3-tetramethyl-10-(p-methylthiophenyl)benzo[b][1,6]naphthyridine;
7,8-dimethoxy-1,2,3,4-tetrahydro-1,1,3,3-tetramethyl-10-(p-methoxyphenyl)benzo[b][1,6]naphthyridine;
8-chloro-2-chloroacetyl-1,2,3,4-tetrahydro-10-phenyl-benzo[b][1,6]naphthyridine;
2-amidino-8-chloro-1,2,3,4-tetrahydro-10-phenyl-benzo[b][1,6]naphthyridine;
m-(2-benzyl-8-chloro-1,2,3,4-tetrahydro-10-benzo-[b][1,6]naphthyridinyl)benzensulfonamide;
2-benzyl-6-chloro-1,2,3,4-tetrahydro-10-phenyl-benzo[b][1,6]naphthyridine;
2-benzyl-7-chloro-1,2,3,4-tetrahydro-10-phenyl-benzo[b][1,6]naphthyridine;
10-anilino-7-chloro-1,2,3,4-tetrahydro-2-methyl-benzo[b][1,6]naphthyridine;
7-chloro-1,2,3,4-tetrahydro-2-methyl-10-(phenylthio)-benzo[b][1,6]naphthyridine;
1-(7-chloro-1,2,3,4-tetrahydro-2-methylbenzo[b][1,6]-naphthyridin-10-yl)-2-phenylhydrazine;
10-anilino-8-chloro-1,2,3,4-tetrahydro-2-methylbenzo-[b][1,6]naphthyridine; and
3-(8-chloro-1,2,3,4-tetrahydro-10-phenylbenzo[b][1,6]-naphthyridin-2-yl)-5,5-dimethyl-2-cyclohexen-1-one also possess valuable antibacterial properties. More particularly, these seventeen compounds, when tested in standard bacteriological procedures have exhibited utility as antibacterial compounds, especially as antitubercular agents.

The in vitro bacteriocidal activity of these seventeen compounds of this invention against tubercle bacilli is tested by the following procedure:

A stock soluton containing 1000 $\mu$g./ml. of a test compound in a suitable vehicle e.g. water is prepared. One ml. quantities of various dilutions of this stock solution are added to individual tubes containing 9 ml. of medium to give final concentrations within the range of 0.01 to 100 $\mu$g./ml. These tubes are then seeded with 0.1 ml. of standardized bacterial suspension and incubated for two weeks at 37° C. The media employed in Dubos Oleic acid liquid medium and the stock cultures are maintained on Dorset egg agar. The organisms used are *M. tuberculosis*, human type, strain H 37 Rv and *M. tuberculosis*, bovine type, strain Ravenel. The results are expressed as minimal inhibitory concentration (MIC) in $\mu$g./ml. which is the least concentration of a compound that will completely prevent the growth of the organism. In the above test, these seventeen tetrahydrobenzonaphthyridine compounds of this invention completely inhibit the growth of tubercle bacilli at a MIC in the range of about 0.5 to about 50 $\mu$g./ml.

As has been mentioned hereinabove, these latter seventeen tetrahydrobenzonaphthyridine compounds of this invention are also biocidally active, as antibacterial agents. In this connection, they exhibit activity against pathogenic bacteria, specifically in vitro antitubercular activity as bacteriocidal agents against tubercle bacteria. Their bacteriocidal properties make these seventeen compounds valuable in biocidal compositions in a variety of important fields for use. For example, they can be formulated and used in bacteriocidally active institutional cleaning compositions, and in soaps and detergents. These compositions are employed for washing equipment in hospitals and homes, instruments used in medicine and bacteriology, clothing used in bacteriological laboratories, and floors, walls and ceiling in rooms in which a background free of tubercle bacteria is desired. When either the two above-described anti-amebic agents or the seventeen aforesaid anti-tubercular agents are used for their biocidal purposes, they are applied according to their desired end-uses as powders, solutions, suspensions and the like, containing the active substance generally in concentrations of 0.1% to 0.7% by weight, or even as much as 1%, 1.5%, 1.8%, 2% and up to about 5%. In washing solutions, e.g. for hospitals and homes, the active anti-amebic and anti-tubercular compounds of this invention will be used generally in the range of from about 0.02% to .25% by weight.

Although, in common with most organic substances, with relatively high molecular weights, the anti-amebic and anti-tubercular compounds of this invention have limited solubility in water, those skilled in the art will have no great difficulty in formulating them into a wide variety of biocidally-active compositions. In general, standard techniques can be employed and, where necessary, advantage is taken of the ability of these compounds to form salts with acids, which have enhanced solubility in water. The active compounds per se can be made up in dilute aqueous solution. They can also be formulated as suspensions or solutions in an aqueous vehicle containing an organic co-solvent, such as, for example, an alkanol. Also, aqueous vehicles containing emulsifying agents, such as sodium lauryl sulfate, and relatively high concentrations, e.g., up to about 5% by weight, of the compounds of this invention can be formulated by conventional techniques.

The reactants employed in the first three above-described processes are known compounds which are commercially available and/or prepared by well known procedures. In this regard, the "4-piperidone" reactants may be prepared by the methods described in S. M. McElvain and K. Rorig in J. Am. Chem. Soc. 70, 1829 (1948); S. M. McElvain in J. Am. Chem. Soc. 46, 1725 (1924); S. M. McElvain in J. Am. Chem. Soc. 48, 2179 (1926); S. M. McElvain and G. Stork in J. Am Chem. Soc. 68, 1049 (1946); J. R. Thayer and S. M. McElvain in J. Am. Chem. Soc. 49, 2862 (1927); J. B. Baty, G. Jones and C. Moore in J. C. pg. 2645 (1967); and J. Guareschi, Ber. 28, 160 (1895).

The "o-aminocarbonyl compound" reactants employed in the first above-described process may be prepared by the procedures described by: G. N. Walker in J. Org. Chem. 27 1929 (1962); F. Korte and O. Behner in Ann. 621, 51 (1959); S. Bell et al., in U.S. Pat. No. 3,516,992 of June 23, 1970 entitled "3-(2-Amino-5-Malo, 5-Alkyl- and-5-Alkoxy)Benzene Sulfonamides"; L. H. Sternbach et al. in J. Org. Chem. 26, 448 (1961); and L. H. Sternbach et al. in J. Org. Chem. 27, 3781 (1962).

The "2-aminobenzonitrile" reactants employed in the new and novel second above-described process may be prepared by the procedures described by: S. Gabriel in Ber. 36, 804 (1903); J. Pinnow and C. Samann in Ber. 29, 624 (1896); W. Borsche, H. Weussman and A. Fritzsche in Ber. 57, 1151 (1924); and L. H. Sternbach et al. in J. Org. Chem. 27, 3781 (1962).

The "anthranilic acid" reactants employed in the third above-described process may be prepared by the procedures described in the text "Chemistry of Carbon Compounds," vol. 3A, pp. 576–8, Editor E. H. Rodd, Elsevien, N.Y. (1954).

EXAMPLE I

Hydrogen chloride (gas) is bubbled into a hot melt of 2-amino-5-chlorobenzophenone (11.58 g., 0.050 m.) and 1-methyl-4-piperidone (5.66 g., 0.050 m.) for several minutes. An exothermic reaction takes place, with the concurrent evolution of water, and the melt solidifies. The melt is heated at 200–210° C. for one-half hour, cooled and triturated with 2-propanol to yield a colorless solid which is recrystallized from methanol-water. In this manner, colorless prisms of 8-chloro-1,2,3,4-tetrahydro-2-methyl-10-phenylbenzo[b][1,6]naphthyridine hydrochloride are obtained, (1.4 g., 9%), M.P. 285–90° C.

Analysis.—Calcd. for $C_{19}H_{18}Cl_2N_2$ (percent): C, 66.08; H, 5.26; N, 8.12. Found (percent): C, 65.76; H, 5.10; N, 8.12.

EXAMPLE II

A mixture of 2-amino-5-chlorobenzophenone (11.58 g., 0.050 m.), polyphosphoric acid (330 g.), and 1-methyl-4-piperidone (5.66 g., 0.050 m.) is heated gradually to 205° C. with stirring, and maintained at that temperature for one-half hour. The partially cooled reaction mixture (100–110° C.) is poured with stirring into a mixture of ice and water (500 g.). The resulting solution is filtered to remove a small amount of insoluble solid, then basified with 50% sodium hydroxide (120 cc.). The product separates as a crystalline solid, which is collected, washed thoroughly with water, and dried, M.P. 148° C. (uncorr.). Recrystallization from hexane yields pale yellow prisms of 8 - chloro - 1,2,3,4-tetrahydro-2-methyl-10-phenylbenzo[b][1,6]naphthyridine (9.0 g., 58.4%), M.P. 149.0–149.5° C. (uncorr.).

Analysis.—Calcd. for $C_{19}H_{17}ClN_2$ (percent): C, 73.90; H, 5.55; N, 907. Found (percent): C, 73.61; H, 5.28; N, 9.22.

Repeating of the above reaction at 145° C. for one hour produces a quantitative yield of the same product, M.P. 149.0–149.5° C. (uncorr.).

EXAMPLE III

A mixture of 2-amino-5-chlorobenzophenone (11.0 g.) polyphosphoric acid (330 g.), and 1-benzyl-4-piperidone (5.8 g.) is heated gradually to about 200° C. with stirring, and maintained at that temperature for three quarters of an hour. The partially cooled reaction mixture (100° C.) is poured with stirring into a mixture of ice and water (500 g.). The resulting solution is filtered and then basified with 50% sodium hydroxide (120 cc.). The product separates as a yellow solid, which is collected, washed thoroughly with water and dried, M.P. 164–165.5° C. (uncorr.). Recrystallization from 2-propanol affords pale yellow, rhomboid crystals of 2-benzyl-8-chloro-1,2,3,4-tetrahydro-10-phenylbenzo[b][1,6]naphthyridine (19.35 g., 50.3%), M.P. 166.0–166.5° C. (uncorr.).

Analysis.—Calcd. for $C_{25}H_{21}ClN_2$ (percent): C, 78.00; H, 5.50; N, 7.28. Found (percent): C, 77.76; H, 5.27; N, 7.38.

In a similar manner, 2-benzyl-7-bromo-1,2,3,4-tetrahydro - 10 - (p-tolyl)benzo[b][1,6]naphthyridine and 2-acetyl - 1,2,3,4 - tetrahydro-10-(p-methoxyphenyl-8-methyl-benzo[b][1,6]naphthyridine are obtained.

EXAMPLE IV

Dry hydrogen chloride is passed into another solution of the above prepared 2-benzyl-8-chloro-1,2,3,4-tetrahydro-10-phenylbenzo[b][1,6]naphthyridine. Thereafter, the corresponding hydrochloride salt is recrystallized from absolute ethanol to yield colorless crystals of 2-benzyl-8-chloro - 1,2,3,4-tetrahydro-10-phenylbenzo[b][1,6]naphthyridine hydrochloride, M.P. 271.5–275° C. (uncorr.).

Analysis.—Calcd. for $C_{25}H_{22}Cl_2N_2$ (percent): C, 71.25; H, 5.27; N, 6.65. Found (percent): C, 71.46; H, 5.42; N, 6.73.

EXAMPLE V 2-amino-5-chlorobenzophenone (23.17 g., 0.10 m.), polyphosphoric acid (600 g.), and 1-(2-phenethyl)-4-piperidone (20.33 g., 0.10 m.) are admixed, heated to 150° C. with stirring, and maintained at that temperature for one hour. The reaction mixture is cooled and, thereafter, is poured with stirring into a mixture of ice and water (1000 g.). The resulting solution is filtered to remove a small amount of insoluble solid, then basified with 50% sodium hydroxide (240 cc.). The resulting 8-chloro-1,2,3,4 - tetrahydro - 2-(2-phenethyl)-10-phenylbenzo[b][1,6]naphthyridine separates as a solid, which is dissolved in ether and treated with dry hydrogen chloride. In this manner, is obtained 8-chloro-1,2,3,4-tetrahydro - 2 - (2-phenethyl)-10-phenylbenzo[b][1,6]naphthyridine hydrochloride, M.P. 268–269.5° C.

Analysis.—Calcd. for $C_{26}H_{24}Cl_2N_2$ (percent): C, 71.71; H, 5.56; N, 6.44. Found (percent): C, 71.49; H, 5.49; N, 6.56.

Similarly, the following tetrahydrobenzonaphthyridine hydrochlorides are synthesized:

10-(p-bromophenyl)-2-ethyl-1,2,3,4-tetrahydro-7-nitro-benzo[b][1,6]naphthyridine hydrochloride;
10-phenyl-1,2,3,4-tetrahydro-2-methylsulfonylbenzo-[b][1,6]naphthyridine hydrochloride;
8-ethyl-1,2,3,4-tetrahydro-10-phenyl-2-propionylbenzo-[b][1,6]naphthyridine hydrochloride; and
7-ethoxy-2-ethyl-1,2,3,4-tetrahydro-10-phenylbenzo-[b][1,6]naphthyridine hydrochloride.

EXAMPLE VI 2-amino-5-chlorophenyl-2-pyridyl ketone (11.64 g., 0.05 m.) and 1-methyl-4-piperidone (5.66 g., 0.050 m.) are admixed, heated gradually with stirring to 145–150° C., and maintained at this temperature for one hour. The cooled reaction mixture is poured with stirring into a mixture of ice-water, filtered and then basified with a 45% potassium hydroxide solution. The resulting crystalline solid is collected by filtration, washed wtih water and dried. In this manner, is obtained 8-chloro-1,2,3,4-tetrahydro-2-methyl - 10 - (2 - pyridyl)benzo[b][1,6]naphthyridine.

Similarly, reacting 2-amino-5-iodophenyl-2-thienyl ketone and 1-butyl-4-piperidone produces 2-butyl-1,2,3,4-tetrahydro - 8 - iodo-10-(2-thienyl)benzo[b][1,6]naphthyridine, while reacting 2-aminophenyl-2-furyl ketone with 4-piperidone yields 10-(2-furyl)-1,2,3,4-tetrahydro-benzo[b][1,6]naphthyridine.

EXAMPLE VII

Repeating the procedure of Example VI to react the following o-aminocarbonyl compounds and 4-piperidones, the hereinafter listed tetrahydrobenzo napththyridines are obtained:

| Reactants | Products |
|---|---|
| 2-amino-5-chlorobenzophenone and 1-(p-chlorophenylsulfonyl)-4-piperidone. | 8-chloro-2-(p-chlorophenylsulfonyl)-1,2,3,4-tetrahydro-10-phenylbenzo[b][1,6]naphthyridine. |
| 2-amino-5-chlorophenyl-2-thienyl ketone and 1-(dimethylcarbamoyl)-4-piperidone. | 8-chloro-1,2,3,4-tetrahydro-2-dimethylcarbamoyl-10-(2-thienyl)benzo[b][1,6]naphthyridine. |
| 2-amino-5-propylbenzophenone and 1-(diethylcarbamoyl)-4-piperidone. | 2-diethylcarbamoyl-1,2,3,4-tetrahydro-10-phenyl-8-propylbenzo[b][1,6]naphthyridine. |

EXAMPLE VIII

Methyl iodide (2.29 g., 0.0162 m.) is added to a solution of 8 - chloro-1,2,3,4-tetrahydro-2-methyl-10-phenylbenzo[b][1,6]naphthyridine (5.0 g., 0.0162 m.) in absolute ether. The mixture is stored at room temperature in the dark overnight. The crystalline product which separates is recrystallized from 2-propanol to obtain colorless crystals of 8-chloro-1,2,3,4-tetrahydro-2,2-dimethyl-10-phenylbenzo[b][1,6]naphthyridinium iodide (1.8 g., 24.4%), M.P. 255–256.5° C. (uncorr.).

Analysis.—Calcd. for $C_{20}H_{20}ClN_2$ (percent): C, 53.28; H, 4.47; N, 6.42. Found (percent): C, 53.12; H, 4.76; N, 6.42.

Similarly, ethyl iodide is reacted with 2-ethyl-1,2,3,4-tetrahydro - 7 - methoxy-10-phenylbenzo[b][1,6)naphthyridine to produce 2,2-diethyl-1,2,3,4-tetrahydro-7-methoxy-10-phenylbenzo[b][1,6]naphthyridinium iodide.

EXAMPLE IX

A solution of 2-benzyl-8-chloro-1,2,3,4-tetrahydro-10-phenylbenzo[b][1,6]napthyridine (6.0 g., 0.0156 m.) in glacial acetic acid (100 ml.) containing platinum oxide (0.3 g.) is hydrogenated at room temperature, and an initial hydrogen pressure of 46.5 p.s.i. for a period of twenty-four hours. The excess acetic acid is distilled in vacuo, the residue dissolved in water, and then basified whereupon the crude product (5.87 g.) M.P. 160–170° C. (uncorr.) separates. Recrystallization from cyclohexanohexane affords colorless crystals of 2-benzyl-8-chloro-1,2,3,4,4a,5,10,10a-octahydro - 10 - phenylbenzo[b][1,6]naphthyridine (2.19 g., 27.7%), M.P. 191.5–193.5° C. (uncorr.).

Analysis.—Calcd. for $C_{25}H_{25}ClN$ (percent): C, 77.21; H, 6.48; N, 7.20; Cl, 9.11. Found (percent): C, 77.51; H, 6.32; N, 7.39; Cl, 8.7.

EXAMPLE X

Employing the procedure of Example IX upon the hereinafter listed above prepared tetrahydrobenzonaphthyridines, the following octahydrobenzonaphthyridines are produced:

| Reactant | Product |
|---|---|
| 8-chloro-1,2,3,4-tetrahydro-2-methyl-10-phenylbenzo[b][1,6]naphthyridine. | 8-chloro-1,2,3,4,4a,5,10,10a-octahydro-2-methyl-10-phenylbenzo[b][1,6]naphthyridine. |
| 2-benzyl-7-bromo-1,2,3,4-tetrahydro-10-(p-tolyl)benzo[b][1,6]naphthyridine. | 2-benzyl-7-bromo-1,2,3,4,4a,5,10,10a-octahydro-10-(p-tolyl)benzo[b][1,6]naphthyridine. |
| 8-chloro-1,2,3,4-tetrahydro-2-(β-phenethyl)-10-phenylbenzo[b][1,6]naphthyridine. | 8-chloro-1,2,3,4,4a,5,10,10a-octahydro-2-(β-phenethyl)-10-phenylbenzo[b][1,6]naphthyridine. |
| 8-chloro-1,2,3,4-tetrahydro-2-methyl-10-(β-pyridyl)benzo[b][1,6]naphthyridine. | 8-chloro-1,2,3,4,4a,5,10,10a-octahydro-2-methyl-10-(β-piperidyl)benzo[b][1,6]naphthyridine. |
| 8-chloro-1,2,3,4-tetrahydro-2-dimethylcarbamoyl-10-(βthienyl)benzo[b][1,6]naphthyridine. | 8-chloro-1,2,3,4,4a,5,10,10a-octahydro-2-dimethylcarbamoyl-10-(β-theinyl)benzo[b][1,6]naphthyridine. |

EXAMPLE XI

A mixture of 2-amino-2′-dichlorobenzophenone, (26.61 g., 0.10 m.), polyphosphoric acid (500 g.) and 1-methyl-4-piperidone (11.32 g., 0.10 m.) is heated to reflux with stirring, and maintained at that temperature for two hours. The cooled reaction mixture is poured with stirring into a mixture of ice and water (1000 g.). The resulting solution is filtered and then basified with 50% sodium hydroxide (120 cc.). The product separates as a yellow crystalline solid, which is collected, washed thoroughly with water, and dried. In this manner, is obtained 8-chloro-10-(o-chlorophenyl)-1,2,3,4-tetrahydro-2-methylbenzo[b][1,6]naphthyridine (31.2 g., 91.0%), M.P. 156.6–157.5° C.

By the procedure of Example IV, the above prepared base is converted to 8-chloro-10-(o-chlorophenyl)-1,2,3,4-tetrahydro - 2 - methylbenzo[b][1,6]naphthyridine hydrochloride, M.P. 275–279° C. (uncorr.).

Analysis.—Calcd. for $C_{19}H_{17}Cl_3N_2$ (percent): C, 60.11; H, 4.51; Cl, 28.01; N, 7.37. Found (percent): C, 60.40; H, 4.41; Cl, 27.2; N, 7.65.

EXAMPLE XII

The procedure of Example XI is repeated to prepare the following tetrahydrobenzo[b][1,6]naphthyridine hydrochlorides from the corresponding starting compounds:

10-(p-ethylphenyl)-2-ethylsulfonyl-1,2,3,4-tetrahydrobenzo[b][1,6]naphthyridine hydrochloride;
7-butoxy-1,2,3,4-tetrahydro-10-(p-methoxyphenyl)-2-phenylsulfonylbenzo[b][1,6]naphthyridine hydro chloride;
1,2,3,4-tetrahydro-2-methoxyethyl-10-phenylbenzo[b][1,6]naphthyridine hydrochloride;
1,2,3,4-tetrahydro-2-dimethylaminoethyl-10-phenylbenzo[b][1,6]naphthyridine hydrochloride; and
7-bromo-10-(p-ethoxyphenyl)-1,2,3,4-tetrahydrobenzo[b][1,6]naphthyridine hydrochloride.

EXAMPLE XIII

A mixture of 2-aminobenzophenone (5.0 g., 0.0368 m.), polyphosphoric acid (350 g.) and 1-benzyl-4-piperidone (5.66 g., 0.050 m.) is heated to reflux overnight. The cooled reaction mixture is poured with stirring into a mixture of ice water. The resulting solution is filtered to remove a small amount of insoluble solid, then basified with 50% potassium hydroxide (100 cc.). The product separates as a crystalline solid, which is collected, washed thoroughly with water, and dried. In this manner, is obtained 2-benzyl-1,2,3,4-tetrahydro - 10 - phenylbenzo[b][1,6]naphthyridine which is dissolved in ether and treated with dry hydrogen chloride to yield the corresponding dihydrochloride salt.

In a similar manner, 2-benzyl-1,2,3,4-tetrahydro-10-phenylbenzo[b][1,6]naphthyridine hydrobromide and 1,2,3,4-tetrahydro - 2 - mehoxypropyl-10-phenylbenzo[b][1,6]naphthyridine hydrochloride are synthesized.

EXAMPLE XIV 2-amino-5-chlorobenzophenone (11.58 g., 0.050 m.), polyphosphoric acid (330 g.), and 2,2,6,6-tetramethyl-4-piperidone (7.76 g., 0.050 m.) are admixed, heated gradually to 140° C. with stirring, and maintained at that temperature for three hours. The reaction mixture is cooled to 100° C. and is poured with stirring into a mixture of ice and water (600 g.). The resulting solution is filtered to remove a small amount of insoluble solid, then basified with 25% potassium hydroxide (240 cc.). The crude product separates as a crystalline solid which is filtered, washed and dried, (9.1 g.). Upon recrystallization from hexane, there is obtained colorless prisms of 8-chloro-1,2,3,4-tetrahydro-1,1,3,3-tetramethyl - 10 - phenylbenzo[b][1,6]naphthyridine (4.30 g., 24.5%, M.P. 176–178° C. (uncorr.).

Analysis.—Calcd. for $C_{22}H_{23}ClN_2$ (percent): C, 75.32; H, 5.72; N, 8.37. Found (percent): C, 75.38; H, 5.56; N, 8.44.

The above prepared base is converted by the procedure of Example IV to colorless prisms of the corresponding hydrochloride, M.P. 312° C.

13

*Analysis.*—Calcd. for $C_{22}H_{24}Cl_2N_2$ (percent): C, 68.22; H, 6.25; Cl, 18.30; N, 7.23. Found (percent): C, 68.00; H, 6.44; Cl, 18.0; N, 6.95.

EXAMPLE XV 2-amino-2′,5-dichlorobenzophenone (13.31 g., 0.050 m.) is reacted with 2,2,6,6-tetramethyl - 4 - piperidone (7.76 g., 0.050 m.) by the procedure described in Example XIV to produce colorless prisms of 8-chloro-10-(o-chlorophenyl)-1,2,3,4-tetrahydro - 1,1,3,3 - tetramethyl-benzo[b][1,6]naphthyridine, M.P. 194–195° C. (uncorr.).

*Analysis.*—Calcd. for $C_{22}H_{22}Cl_2N_2$ (percent): C, 68.57; H, 5.76; Cl, 18.40; N, 7.27. Found (percent): C, 68.63; N, 5.81; Cl, 18.1; N, 7.07.

The above prepared base is converted to the hydrochloride in a manner similar to that of Example IV and colorless crystals thereof are obtained from 95% ethanol, M.P. 310° C. (uncorr.).

*Analysis.*—Calcd. for $C_{22}H_{23}Cl_3N_2$ (percent): C, 62.64; H, 5.49; Cl, 25.22; N, 6.64. Found (percent): C, 62.60; H, 5.56; Cl, 25.2; N, 6.75.

EXAMPLE XVI

The procedure of Example XIV is again repeated reacting a 2-amino-5-substituted benzophenone with a 2,2,6,6-tetramethyl-4-piperidone to synthesize the following compounds:

8-bromo-1,2,3,4-tetrahydro-1,1,3,3-tetramethyl-10-phenyl-2-propoxyethylbenzo[b][1,6]naphthyridine;

2-(p-bromophenyl)-1,2,3,4-tetrahydro-10-(p-iodophenyl)-1,1,3,3-tetramethylbenzo[b][1,6]naphthyridine;

8-chloro-1,2,3,4-tetrahydro-1,1,3,3-pentamethyl-10-phenylbenzo[b][1,6]naphthyridine; and 8-chloro-1,2,3,4-tetrahydro-1,1,3,3-tetramethyl-10-(p-methoxyphenyl)benzo[b][1,6]naphthyridine.

EXAMPLE XVII 2-amino-5-chlorobenzophenone (16.62 g., 0.0718 m.), polyphosphoric acid (500 g.) and tropinone (10.0 g., 0.0718 m.) are mixed, heated to 150° C. with stirring, and maintained at that temperature for one-half hour. Thereafter, upon cooling the reaction mixture is poured into a mixture of ice and water (500 g.) with stirring. The solution is filtered, basified with 10 N sodium hydroxide, and the resulting solid is separated by filtration (21.3 g., 88.8%), M.P. 175–177° C. (uncorr.). Upon recrystallization from a benzene-hexane mixture, there is obtained colorless prisms of 8-chloro-1,2,3,4-tetrahydro-2 - methyl - 10 - phenyl - 1,3-ethanobenzo[b][1,6]naphthyridine (13.6 g., 56.7%), M.P. 190–191° C. (uncorr.).

*Analysis.*—Calcd. for $C_{21}H_{19}ClN_2$ (percent): C, 75.32; H, 5.72; N, 8.37. Found (percent): C, 75.38; H, 5.56; N, 8.44

The corresponding hydrochloride is prepared as colorless crystals from ethanol, M.P. 310° C.

*Analysis.*—Calcd. for $C_{21}H_{20}Cl_2N_2$ (percent): C, 67.93; H, 5.43; Cl, 19.10; N, 7.54. Found (percent): C, 67.65; H, 5.33; Cl, 18.9; N, 7.55.

EXAMPLE XVIII

A mixture of 0.0346 m. of 2-amino-3-chlorobenzophenone, 0.0346 m. of 1-benzoyl-4-piperidone hydrochloride and 35 ml. of trifluoroacetic acid is refluxed for three hours. The solution is evaporated under vacuum and the residue is dissolved in methylene chloride which is then extracted with a 20% aqueous potassium hydroxide solution. The methylene chloride solution is washed with water, dried over anhydrous sodium sulfate and evaporated giving the crude product. Recrystallization of the free base from hexane affords a white solid which is 2-benzoyl - 8 - chloro - 1,2,3,4-tetrahydro-10-phenylbenzo[b][1,6]naphthyridine, M.P. 195–6° C.

*Analysis.*—Calcd. for $C_{25}H_{19}ClN_2O$ (percent): C, 75.27; H, 4.80; N, 7.03; Cl, 8.89. Found (percent): C, 75.00; H, 4.48; N, 7.03; Cl, 8.7.

14

EXAMPLE XIX

Freshly distilled ethyl chloroformate (2.9 ml., 0.030 m.) in dry benzene (30 ml.) is added dropwise with stirring to a solution of 8-chloro-1,2,3,4-tetrahydro-2-methyl - 10 - phenylbenzo[b][1,6]naphthyridine (6.8 g., 0.02 mole) in dry benzene (70 ml.). The solution is refluxed for twenty-four hours and then cooled and filtered. The filtrate is washed with water, dried and evaporated giving a solid (2.5 g.), M.P. 146–9° C. Recrystallization from cyclohexane affords 8 - chloro-2-ethoxycarbonyl-1,2,3,4 - tetrahydro - 10 - phenylbenzo[b][1,6]naphthyridine, as a crystalline solid (1.8 g.), M.P. 153–4° C.

*Analysis.*—Calcd. for $C_{21}H_{19}ClN_2O_2$ (percent): C, 68.76; H, 5.22; N, 7.63; Cl, 9.66. Found (percent): C, 68.93; H, 4.96; N, 7.77; Cl, 9.7.

Similarly, 2 - butoxycarbonyl - 1,2,3,4-tetrahydro-10-phenylbenzo[b][1,6]naphthyridine is produced.

EXAMPLE XX

A solution of 8-chloro-2-ethoxycarbonyl-1,2,3,4-tetrahydro - 10 - phenylbenzo[b][1,6]naphthyridine (0.7 g., 0.0019 m.), as prepared above, in potassium hydroxide (5 g.), n-propyl alcohol (20 ml.) and water (0.5 ml.) is refluxed for three hours. The solution is evaporated and the residue dissolved in benzene followed by extraction with water. Evaporation of the benzene solution gives the product (0.5 g., 92%, M.P. 130–3° C.). Recrystallization from cyclohexane-hexane affords yellow crystals of 8-chloro - 1,2,3,4 - tetrahydro-10-phenylbenzo[b][1,6]naphthyridine, M.P. 137–9° C.

*Analysis.*—Calcd. for $C_{18}H_{15}ClN_2$ (percent): C, 73.34; H, 5.13; N, 9.51; Cl, 12.03. Found percent): C, 72.75; H, 5.09; N, 9.44; Cl, 11.7.

Similar treatment of the above prepared 2-butoxycarbonyl - 1,2,3,4 - tetrahydro - 10 - phenylbenzo[b][1,6]naphthyridine affords 1,2,3,4-tetrahydro-10-phenylbenzo[b][1,6]naphthyridine.

EXAMPLE XXI

To a solution of 8-chloro-1,2,3,4-tetrahydro-10-phenylbenzo[b][1,6]naphthyridine (2.0 g., 0.00683 m.) in tetrahydrofuran (20 ml.) and 10% aqueous sodium hydroxide (10 ml.) at 0° C. is slowly added chloroacetyl chloride (0.6 ml., 0.08 m.) and stirred for forty-five minutes. Water (100 ml.) is added and the product collected (2.3 g.), M.P. 150–2° C. Recrystallization from benzene-hexane affords 8-chloro-2-chloroacetyl-1,2,3,4-tetrahydro-10-phenylbenzo[b][1,6]naphthyridine as yellow crystals, M.P. 158–9° C.

*Analysis.*—Calcd. for $C_{20}H_{16}Cl_2N_2O$ (percent): C, 64.70; H, 4.35; N, 7.55; Cl, 19.5. Found (percent): C, 64.98; H, 4.23; N, 7.70; Cl, 19.0.

Repeating the aforesaid procedure to react an appropriate tetrahydrobenzonaphthyridine with a haloalkanoyl chloride, the following compounds are prepared:

10-phenyl-2-(3-bromopropionyl)-1,2,3,4-tetrahydro-benzo[b][1,6]naphthyridine;

7-methoxy-2-iodoacetyl-1,2,3,4-tetrahydro-10-phenyl-benzo[b][1,6]naphthyridine; and 2-fluoroacetyl-1,2,3,4-tetrahydro-10-phenyl-benzo[b][1,6]naphthyridine.

EXAMPLE XXII

A solution of 8-chloro-1,2,3,4-tetrahydro - 10 - phenyl-benzo[b][1,6]naphthyridine (5.0 g., 0.017 m.), glycidol (1.26 g., 0.017 m.) and xylene (40 ml.) is refluxed for fifteen hours. Evaporation of the solution gives an oil which afford a solid upon extraction with cyclohexane. Recrystallization from ethyl acetate affords 8-chloro-2-(2,3-dihydroxypropyl) - 1,2,3,4 - tetrahydro - 10 - phenylbenzo[b][1,6]naphthyridine, light yellow solid, M.P. 154–5° C.

*Analysis.*—Calcd. for $C_{21}H_{21}ClN_2O_2$ (percent): C, 68.37; H, 5.74; N, 7.58; Cl, 9.62. Found (percent): C, 68.10; H, 5.82; N, 7.81; Cl, 9.4.

In a similar manner, 8-bromo-2-(2,3-dihydroxybutyl)-1,2,3,4 - tetrahydro-10-phenylbenzo[b][1,6]naphthyridine is synthesized.

EXAMPLE XXIII

A mixture of 8-chloro-1,2,3,4-tetrahydro-10-phenylbenzo[b][1,6]naphthyridine (8.5 g., 0.029 m.) and 1-guanyl-3,5-dimethylpyrazole nitrate (2.9 g., 0.0144 m.) is ground together and stirred under nitrogen at 160–5° C. for two hours. Upon cooling the gum is heated with ethyl acetate (30 ml.) and the product filtered after cooling (4.7 g., 0.0117 m., 82%). Recrystallization from ethanol-water affords white crystals of 2-amidino-8-chloro-1,2,3,4-tetrahydro-10-phenylbenzo[b][1,6]naphthyridine nitrate, M.P. 270–1° C. decomp.

*Analysis.*—Calcd. for $C_{19}H_{17}ClN_4 \cdot HNO_3$ (percent): C, 57.07; H, 4.34; N, 17.52; Cl, 8.87. Found (percent): C, 57.14; H, 4.50; N, 17.34; Cl, 8.8.

EXAMPLE XXIV

A solution of 8-chloro - 2 - chloroacetyl-1,2,3,4-tetrahydro-10-phenylbenzo[b][1,6]naphthyridine (6.0 g., 0.161 m.), diethylamino (3.4 ml., 0.0322 m.), anhydrous potassium carbonate (4.45 g.) and dimethyl formamide (50 ml.) is heated at 55° C. for three hours. Filtration and evaporation of the solvent gives a gum. This is dissolved in methylene chloride, extracted with water and evaporated, giving an oil. The oil is dissolved in a 2% hydrochloric acid solution and filtered. The filtrate is made alkaline, extracted with methylene chloride and evaporated giving a gum. The crude base is added to a hot solution of p-toluene sulphonic acid in tetrahydrofuran. A solid is obtained and recrystallization from tetrahydrofuranethanol affords white crystals of 8-chloro-2-(2-diethylaminoacetyl) - 1,2,3,4-tetrahydro-10-phenylbenzo[b][1,6]naphthyridine di-p-toluene sulfonate, M.P. 225–6° C. decomp.

*Analysis.*—Calcd. for $C_{24}H_{26}ClN_3O \cdot 2C_7H_8O_3S$ (percent): C, 60.67; H, 5.63; N, 5.59; Cl, 4.7. Found (percent): C, 60.70; H, 5.34; N, 5.74; Cl, 4.8.

In a similar manner, the following compounds are prepared:

1,2,3,4-tetrahydro-2-(3-dimethylaminopropionyl)-10-(p-tolyl)benzo[b][1,6]naphthyridine dihydrochloride; and
1,2,3,4-tetrahydro-7-methyl-10-phenyl-2-(4-dipropylaminobutyryl)benzo[b][1,6]naphthyridine di-p-toluene sulfonate.

EXAMPLE XXV

To a solution of 8-chloro-1,2,3,4-tetrahydro-10-phenylbenzo[b][1,6]naphthyridine (6.0 g., 0.0204 m.), triethylamine (3.34 ml., 0.024 m.) and tetrahydrofuran (100 ml.) at 0° C. is slowly added dichloroacetyl chloride (2.02 ml., 0.021 m.) and the mixture is stirred for two hours. Evaporation of the tetrahydrofuran gives a solid which is slurried with chloroform and water. The water is separated and the product recrystallized from benzene affording white crystals of 8-chloro-2-dichloroacetyl-1,2,3,4-tetrahydro - 10 - phenylbenzo[b][1,6]naphthyridine, M.P. 215–6° C.

*Analysis.*—Calcd. for $C_{20}H_{15}Cl_3N_2O$ (percent): C, 59.20; H, 3.72; N, 6.91; Cl, 26.2. Found (percent): C, 59.70; H, 3.92; N, 6.53; Cl, 25.8.

EXAMPLE XXVI

A mixture of 0.0346 m. of 2-amino-3-chlorobenzophenone, 0.0346 m. of 1-(3-dimethylaminopropyl)-4-piperidone hydrochloride and 35 ml. of trifluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product which is converted to the maleate salt by interaction with maleic acid in acetone. Addition of ethyl ether precipitates the salt which is recrystallized from acetonitrile to yield 8-chloro-2-(3-dimethylaminopropyl)-1,2,3,4-tetrahydro - 10 - phenylbenzo[b][]1,6]naphthyridine dimaleate, M.P. 173–4° C. decomp.

*Analysis.*—Calcd. for $C_{23}H_{26}ClN_3 \cdot 2C_4H_4O_4$ (percent): C, 60.83; H, 5.60; N, 6.86; Cl, 5.79. Found (percent): C, 60.67; H, 5.76; N, 6.80; Cl, 5.8.

EXAMPLE XXVII

A mixture of (0.0346 m.) 2-amino-3,5-dichlorobenzophenone, (0.0346 m.) of 4-benzylpiperidone hydrochloride and 35 ml. of trifluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product as a brown gummy solid, which is collected, washed thoroughly with water, reacted with dry hydrogen chloride by the procedure of Example IV and recrystallized from n-propyl alcohol and water to afford yellow crystals of 2-benzyl-6,8-dichloro-1,2,3,4-tetrahydro - 10-phenylbenzo[b][1,6]naphthyridine dihydrochloride, M.P. 272–3° C. decomp.

*Analysis.*—Calcd. for $C_{25}H_{20}N_2Cl_2 \cdot HCl$ (percent): C, 65.87; H, 4.64; N, 6.14; Cl, 23.3. Found (percent): C, 65.71; H, 4.69; N, 5.98; Cl, 23.0.

EXAMPLE XXVIII

Repeating the procedure of Example XXVII to react an appropriate 2-aminobenzophenone and a 4-piperidone, the hereinafter listed tetrahydronaphthyridines are obtained:

8-ethyl-2-(2,3-dihydroxypropyl)-1,2,3,4-tetrahydro-10-phenylbenzo[b][1,6]naphthyridine;
8-bromo-1,2,3,4-tetrahydro-2-methoxycarbonyl-10-phenylbenzo[b][1,6]naphthyridine;
10-phenyl-2-chloroacetyl-1,2,3,4-tetrahydrobenzo[b][1,6]naphthyridine;
2-amidino-1,2,3,4-tetrahydro-10-phenyl-7-propylbenzo[b][1,6]naphthyridine;
8-bromo-2-(2-diethylaminoacetyl)-1,2,3,4-tetrahydro-10-phenylbenzo[b][1,6]naphthyridine;
2-(2,2-dichloroacetyl)-1,2,3,4-tetrahydro-10-(p-tolyl)benzo[b][1,6]naphthyridine;
10-(p-bromophenyl)-1,2,3,4-tetrahydro-2,7-dimethyl-8-methylsulfonylbenzo[b][1,6]naphthyridine;
2-ethyl-1,2,3,4-tetrahydro-10-phenyl-8-sulfamoylbenzo[b][1,6]naphthylridine;
10-phenyl-7-chloro-1,2,3,4-tetrahydro-8-sulfamoylbenzo[b][1,6]naphthyridine;
7-carbamoyl-8-trifluoromethyl-1,2,3,4-tetrahydro-10-phenylbenzo[b][1,6]naphthyridine;
6,9-diethoxy-2-ethoxycarbonyl-1,2,3,4-tetrahydro-10-(p-propylphenyl)benzo[b][1,6]naphthyridine;
8-trifluoromethyl-1,2,3,4-tetrahydro-2-methyl-10-phenylbenzo[b][1,6]naphthyridine;
7,8-dimethyl-1,2,3,4-tetrahydro-2-methoxycarbonyl-10-phenylbenzo[b][1,6]naphthyridine;
7,9-dichloro-2-ethoxycarbonyl-1,2,3,4-tetrahydro-10-(p-tolyl)benzo[b][1,6]naphthyridine;
10-phenyl-1,2,3,4-tetrahydro-7,8-dimethoxy-2-methoxycarbonylbenzo[b][1,6]naphthyridine;
8-ethylthio-1,2,3,4-tetrahydro-2-(2,3-dihydroxypropyl)-10-phenylbenzo[b][1,6]naphthyridine;
2-ethoxycarbonyl-2,7-diethyl-1,2,3,4-tetrahydro-8-methylthio-10-phenylbenzo[b][1,6]naphthyridine; and
1,2,3,4-tetrahydro-10-phenyl-2-propyl-8-propylsulfonylbenzo[b][1,6]naphthyridine.

EXAMPLE XXIX

Employing the procedure of Example IX upon the tetrahydrobenzonaphthyridines of Example XXVIII, the following octahydrobenzonaphthyridines are prepared:

8-ethyl-2-(2,3-dihydroxpropyl)-1,2,3,4,4a,5,10,10a-octahydro-10-phenylbenzo[b][1,6]naphthyridine;
8-bromo-2-methoxycarbonyl-1,2,3,4,4a,5,10,10a-octahydro-10-phenylbenzo[b][1,6]naphthyridine;
10-phenyl-2-chloroacetyl-1,2,3,4,4a,5,10,10a-octahydrobenzo[b][1,6]naphthyridine;
2-amidino-1,2,3,4,4a,5,10,10a-octahydrobenzo-10-phenyl-7-propylbenzo[b][1,6]naphthyridine;
8-bromo-2-(2-diethylaminoacetyl)-1,2,3,4,4a5,10,10a-octahydro-10-phenylbenzo[b][1,6]naphthyridine;
2-(2,2-dichloroacetyl)1,2,3,4,4a,5,10,10a-octahydro-10-(p-tolyl)benzo[b][1,6]naphthyridine;
10-(p-bromophenyl)-1,2,3,4,4a,5,10,10a-octahydro-2,7-dimethyl-8-methylsulfonylbenzo[b][1,6]naphthyridine;
2-ethyl-1,2,3,4,4a,5,10,10a-octahydro-10-phenyl-8-sulfamoylbenzo[b][1,6]naphthyridine;
10-phenyl-7-chloro-1,2,3,4,4a,5,10,10a-octahydro-8-sulfamoylbenzo[b][1,6]naphthyridine;
7-carbamoyl-8-trifluoromethyl-1,2,3,4,4a,5,10,10a-octahydro-10-phenylbenzo[b][1,6]naphthyridine;
6,9-diethoxy-2-ethoxycarbonyl-1,2,3,4,4a,5,10,10a-octahydro-10-(p-propylphenyl)benzo[b][1,6]naphthyridine;
8-trifluoromethyl-1,2,3,4,4a,5,10,10a-octahydro-2-methyl-10-phenylbenzo[b][1,6]naphthyridine;
7,8-diethyl-1,2,3,4,4a,5,10,10a-octahydro-2-methoxycarbonyl-10-phenylbenzo[b][1,6]naphthyridine;
7,9-dichloro-2-ethoxycarbonyl-1,2,3,4,4a,5,10,10a-octahydro-10-(p-tolyl)benzo[b][1,6]naphthyridine;
10-phenyl-1,2,3,4,4a,5,10,10a-octahydro-7,8-dimethoxy-2-methoxycarbonylbenzo[b][1,6]naphthyridine;
8-ethylthio-1,2,3,4,4a,5,10,10a-octahydro-2-(2,3-dihydroxypropyl)-10-phenylbenzo[b][1,6]naphthyridine;
2-ethoxycarbonyl-2,7-diethyl-1,2,3,4,4a,5,10,10a-octahydro-8-methylthio-10-phenylbenzo[b][1,6]naphthyridine; and
1,2,3,4,4a,5,10,10a-octahydro-10-phenyl-2-propyl-8-propylsulfonylbenzo[b][1,6]naphthyridine.

EXAMPLE XXX

To a solution of 252.0 g. (4.5 m.) of potassium hydroxide (assay 85%) in 500 ml. of methanol there are added with stirring and cooling in an ice bath 41.2 g. (0.28 m.) of p-methoxyphenylacetonitrile and a solution of 50.0 g. (0.26 m.) of 3,4-dichloronitrobenzene in 400 ml. of methanol. The mixture is stirred for four hours at 0–5° C. and then 3000 ml. of water is added with stirring. The precipitate is isolated by filtration, dissolved in methylene chloride, washed with water, dried and evaporated. The residue is recrystallized from benzene-hexane giving 23 g. (30%) of 5,6-dichloro-3-(p-methoxyphenyl)-2,1-benzisoxazole. A second recrystallization of the product from n-propanol gives the pure crystalline solid, M.P. 156–8° C. (uncorr.).

*Analysis.*—Calcd. for $C_{14}H_9Cl_2NO_2$ (percent): C, 57.17; H, 3.11; N, 4.76; Cl, 24.11. Found (percent): C, 57.37; H, 3.16; N, 5.04; Cl, 24.8.

A mixture of 2.0 g. (0.0682 m.) of the above prepared 5,6-dichloro-3-(p-methoxyphenyl)-2,1-benzisoxazole, 0.1 g. of 10% palladium on charcoal and 75 ml. of ethyl acetate in a sealed vessel is treated with hydrogen gas at 1–2 atm. and heated to 55° C. for five hours. The solution is filtered and evaporated giving 1.5 g. (74%) of 2-amino-4,5-dichloro-4'-methoxybenzophenone which is recrystallized from absolute ethanol to afford the pure crystalline solid, M.P. 169–170° C. (uncorr.).

*Analysis.*—Calcd. for $C_{14}H_{11}Cl_2NO_2$ (percent): C, 56.76; H, 3.75; N, 4.73; Cl, 23.94. Found (percent): C, 56.72; H, 3.69; N, 4.67; Cl, 23.8.

A mixture of 5.0 g. (0.168 m.) of 2-amino-4,5-dichloro-4'-methoxybenzophenone 3.5 g. (0.185 m.) of 1-benzyl-4-piperidone hydrochloride and 35 ml. of trifluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product which is recrystallized from ethylacetate to afford 4.5 g. (60%) of product. A second recrystallization from tetrahydrofuran gives 2-benzyl-7,8-dichloro-1,2,3,4-tetrahydro-10-(p-methoxyphenyl)benzo[b][1,6]naphthyridine as crystalline solid, M. P. 195–6° C. (uncorr.).

*Analysis.*—Calcd. for $C_{26}H_{22}Cl_2N_2O$ (percent): C, 69.49; H, 4.71; N, 6.24. Found (percent): C, 69.50, H, 4.89; N, 6.30.

Employing the procedure of Example IX, the above product is converted to 2-benzyl-7,8-dichloro-1,2,3,4,4a,5,10,10a - octahydro - 10 - (p - methoxyphenyl)benzo[b][1,6]naphthyridine.

EXAMPLE XXXI 2-amino - 5 - chloro-3'-sulfamylbenzophenone (3.0 g., 0.00965 m.) prepared by the procedure described in copending U.S. Pat. No. 3,516,992 of June 23, 1970, is reacted with 1-benzyl-4-piperidone (1.82 g., 0.00965 ml.) in the manner which is described in Example XXX. Several recrystallizations of the free base from benzene affords m-(2-benzyl-8-chloro-1,2,3,4-tetrahydro-10-benzo[b][1,6]naphthyridinyl)benzenesulfonamide as a crystalline solid, M.P. 189–193° C. (uncorr.).

*Analysis.*—Calcd. for $C_{25}H_{22}ClN_3O_2S$ (percent): C, 64.72; H, 4.78; N, 9.06; Cl, 7.64. Found (percent): C, 64.67; H, 5.00; N, 9.15; Cl, 7.7.

When the above product is hydrogenated by the process of Example IX, there is obtained m-(2-benzyl-8-chloro-1,2,3,4,4a,5,10,10a - octahydro - 10 - benzo[b][1,6]naphthyridinyl)benzenesulfonamide.

EXAMPLE XXXII

A mixture of 7.0 g. (0.03 m.) of 2-amino-3-chlorobenzophenone, 5.5 g. (0.03 m.) of 1-benzyl-4-piperidone hydrochloride and 35 ml. of tetrafluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product as a brown oil. The hydrochloride salt is prepared in a methylene chloride solvent. Evaporation of the solvent and recrystallization of the residue from acetonitrile gives 2-benzyl-6-chloro-1,2,3,4 - tetrahydro - 10 - phenylbenzo[b][1,6]naphthyridine hydrochloride as a crystalline solid (7.0 g., 59%), M.P. 241–2° C. (uncorr.).

*Analysis.*—Calcd. for $C_{25}H_{21}ClN_2 \cdot HCl$ (percent): C, 71.25; H, 5.27; N, 6.65; Cl, 16.8. Found (percent): C, 70.92; H, 5.15; N, 6.85; Cl, 16.9.

In the same manner, reacting the following 2-aminobenzophenones and 4-piperidones the hereinafter products are obtained:

2-amino-5,4'-dichlorobenzophenone (3.8 g., 0.014 m.) is reacted with 1-benzyl-4-piperidone (2.69 g., 0.014 m.). The free base is extracted with hexane giving 2.8 g. (47%) or product as a crystalline solid which is recrystallized twice from cyclohexane to afford 2-benzyl-8-chloro-10-(p-chlorophenyl) - 1,2,3,4 - tetrahydrobenzo[b][1,6]naphthyridine, M.P. 145–6° C. (uncorr.).

*Analysis.*—Calcd. for $C_{25}H_{20}Cl_2N_2$ (percent): C, 71.61; H, 4.81; N, 6.68; Cl, 16.91. Found (percent): C, 71.84; H, 5.02; N, 6.56; Cl, 16.6.

2-amino-5-chloro - 4' - methoxybenzophenone (5.0 g., 0.019 m.) is reacted with 1-benzyl-4-piperidone (3.6 g., 0.019 m.) Recrystallization of the free base from cyclohexane affords 4.0 g. (51%) of crude product which is recrystallized twice from benzene-hexane to yield 2-benzyl-8 - chloro-1,2,3,4-tetrahydro - 10 - (p-methoxyphenyl)benzo[b][1,6]naphthyridine as a crystalline solid, M.P. 176–7° C. (uncorr.).

Analysis.—Calcd. for $C_{26}H_{23}ClN_2O$ (percent): C, 75.26; H, 5.59; N, 6.92; Cl, 8.54. Found (percent): C, 75.30; H, 5.48; N, 6.58; Cl, 8.45.

2-amino-4'-methylbenzophenone (6.0 g., 0.028 m.) is reacted with 2,2,6,6-tetramethyl-4-piperidone hydrochloride (5.5 g., 0.028 m.). Recrystallization of the free base from hexane gives 1,2,3,4-tetrahydro-1,1,3,3-tetramethyl-10-(p-tolyl)benzo[b][1,6]naphthyridine as a crystalline solid, M. P. 191–3° C. (uncorr.).

Analysis.—Calcd. for $C_{23}H_{26}N_2$ (percent): C, 83.58; H, 7.93; N, 8.49. Found (percent): C, 83.23; H, 7.73; N, 8.34.

Employing the procedure of Example IX, the above products are converted to the following:

2-benzyl-6-chloro - 1,2,3,4,4a,5,10,10a - octahydro-10-phenylbenzo[b][1,6]naphthyridine;

2-benzyl - 8 - chloro-10-(p-chlorophenyl)-1,2,3,4,4a,5,10,10a-octahydrobenzo[b][1,6]naphthyridine;

2-benzyl - 8 - chloro-1,2,3,4,4a,5,10,10a-octahydro-10-(p-methoxyphenyl)benzo[b][1,6]naphthyridine; and 1,2,3,4,4a,5,10,10a-octahydro - 1,1,3,3 - tetramethyl-10-(p-tolyl)benzo[b][1,6]naphthyridine.

EXAMPLE XXXIII

A mixture of 8.0 g. (0.0346 m.) of 2-amino-3-chlorobenzophenone, 6.63 g. (0.0346 m.) of 2,2,6,6-tetramethyl-4-piperidone hydrochloride and 35 ml. of trifluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product. Recrystallization of the free base from hexane affords 6-chloro-1,2,3,4-tetrahydro-1,1,3,3-tetramethyl - 10 - phenylbenzo[b][1,6]naphthyridine as a crystalline solid, (46%), M.P. 167–8° C. (uncorr.).

Analysis.—Calcd. for $C_{22}H_{23}ClN_2$ (percent): C, 75.30; H, 6.61; N, 7.98. Found (percent): C, 75.14; H, 6.66; N, 7.97.

Similarly, 2-amino - 4,5,4' - trimethoxybenzophenone (5.0 g., 0.0174 m.) is reacted with 2,2,6,6-tetramethylpiperidone hydrochloride (3.34 g., 0.0174 m.). The free base is dissolved in absolute ethanol, filtered and the solvent evaporated. Recrystallization of the residue from cyclohexane affords 7,8-dimethoxy - 1,2,3,4 - tetrahydro-1,1,3,3 - tetramethyl - 10 - (p-methoxyphenyl)benzo[b][1,6]naphthyridine as a crystalline solid, 2.7 g. (37%), M.P. 179–182° C. (uncorr.).

Analysis.—Calcd. for $C_{25}H_{30}N_2O_3$ (percent): 73.86; H, 7.44; N, 6.89.

Found (percent): C, 73.73; H, 7.58; N, 6.63.

When the above products are hydrogenated by the process of Example IX, the following compounds are obtained: 6 - chloro - 1,2,3,4,4a,5,10,10a - octahydro-1,1,3,3-tetramethyl - 10 - phenylbenzo[b][1,6]naphthyridine; and 7,8 - dimethoxy-1,2,3,4,4a,5,10,10a-octahydro-1,1,3,3 - tetramethyl-10-(p-methoxyphenyl)benzo[b][1,6]naphthyridine.

EXAMPLE XXXIV

A Grignard reagent prepared from 66.8 (0.41 m.) of 2-bromothiophene and 11.4 g. (0.45 m.) of magnesium in 200 ml. of ether is slowly added over a period of one-half hour to a solution of 80.0 g. (0.41 m.) of 2-methyl-7-chloro-4H-3,1-benzoxazin-4-one, prepared as described in Ind. J. Pharm. by Somasekhara et al. 27, 12–13 (1965), in 575 ml. of benzene keeping the temperature at 15–20° C. during the addition. The reaction mixture is then stirred for forty-five minutes at 50–60° C. After cooling to 20° C., the complex is decomposed by the slow addition of 350 ml. of 2 N hydrochloric acid. The organic layer is separated, washed with dilute sodium hydroxide, water, dried over sodium sulfate and evaporated to dryness. The product is triturated with absolute ethanol and recrystallized from cyclohexane giving 2-acetamido-4-chlorophenyl-2'-thienyl ketone as a crystalline solid, M.P. 100–101° C. (uncorr.).

Analysis.—Calcd. for $C_{13}H_{10}ClNO_2S$ (percent): C, 55.80; H, 3.60; N, 5.00; Cl, 12.67; S, 11.46. Found (percent): C, 55.76; H, 3.27; N, 5.00; Cl, 12.7; S, 11.1.

A solution of 59.4 g. (0.212 m.) of 2-acetamido-4-chlorophenyl-2'-thienyl ketone in 1400 ml. of ethanol and 600 ml. of 6 N hydrochloric acid is refluxed for four hours. The residue obtained, after evaporation of the solvent, is basified with sodium carbonate and extracted with methylene chloride. The methylene chloride solution is dried over sodium sulfate and evaporated leaving 39 g. of solid. Recrystallization of the product from cyclohexane gives 2-amino-4-chlorophenyl-2'-thienyl ketone, M.P. 79–81° C., (uncorr.).

Analysis.—Calcd. for $C_{11}H_8ClNOS$ (percent): C, 55.55; H, 3.39; N, 5.89; Cl, 14.92; S, 13.49. Found (percent): C, 55.78; H, 3.19; N, 5.83; Cl, 14.9; S, 13.4.

A mixture of 2-acetamido-4-chlorophenyl-2'-thienyl ketone (0.212 m.), 1-methyl-4-piperidone (0.021 m.) and 40 ml. of glacial acetic acid is refluxed for four hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product. Trituration of the free base with hexane gives 7-chloro-1,2,3,4-tetrahydro-2-methyl-10-(2-thienyl)-benzo[b][1,6]naphthyridine as a crystalline solid (4.8 g., 73%), M.P. 141–3° C. (uncorr.).

Analysis.—Calcd. for $C_{17}H_{15}ClN_2S$ (percent): C, 64.86; H, 4.80; N, 8.89. Found (percent): C, 65.16; H, 4.91; N, 8.92.

When the above compound is hydrogenated by the procedure of Example IX, there is afforded 7-chloro-1,2,3,4,4a,5,10,10a - octahydro - 2 - methyl - 10 - (2-thienyl)benzo[b][1,6]naphthyridine.

EXAMPLE XXXV

Following the procedure described in Example XXXIV, 8.33 g. (0.41 m.) of 4-bromothioanisole, 11.4 g. (0.45 m.) of magnesium and 80.0 g. (0.41 m.) of 2-methyl-7-chloro-4H-3,1-benzoxazin - 4 - one produce 5'-chloro-2'-(p-methylthiobenzoyl)acetanilide. Recrystallization of the product from methanol affords a crystalline solid, wt. 31.0 g. (25%), M.P. 85–7° C. (uncorr.).

Analysis.—Calcd. for $C_{16}H_{14}ClNO_2S$ (percent): C, 60.09; H, 4.41; N, 4.38. Found (percent): C, 59.94; H, 4.35; N, 4.47.

Following the procedure described in Example XXXIV, 26.2 g. (0.082 m.) of 5'-chloro-2'-(p-methylthiobenzoyl)acetanilide are hydrolyzed to give 24 g., M.P. 119–23° C. of 2-amino-4-chloro-4'-methylthiobenzophenone. Recrystallization of the product from cyclohexane affords a crystalline solid, M.P. 122–4° C. (uncorr.).

Analysis. — Calcd. for $C_{14}H_{12}ClNOS$ (percent): C, 60.52; H, 4.35; N, 5.04. Found (percent): C, 60.32; H, 4.29; N, 4.89.

A mixture of 5.0 g. (0.018 m.) of 2-amino-4-chloro-4' - methylthiobenzophenone, 3.45 g. (0.018 m.) of 2,2,6,6-tetramethyl-4-piperidone hydrochloride and 35 ml. of trifluoroacetic acid is refluxed for three hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product. Recrystallization of the free base from hexane affords 7-chloro-1,2,3,4-tetrahydro-1,1,3,3-tetramethyl-10-(p - methylthiophenyl)benzo[b][1,6]naphthyridine as a crystalline solid 4.8 g. (67%), M.P. 162–4° C. (uncorr.).

Analysis.—Calcd. for $C_{23}H_{25}ClN_2S$ (percent): C, 69.58; H, 6.35; N, 7.06. Found (percent): C, 69.41; H, 6.05; N, 7.22.

In a similar manner, 10-(p-ethylthiophenyl)-1,2,3,4-tetrahydro - 1,1,3,3 - tetramethylbenzo[b][1,6]naphthyridine; and 10 - (m - butylthiophenyl)1,2,3,4-tetrahydro-7-methylbenzo[b][1,6]naphthyridine are produced.

EXAMPLE XXXVI

Following the procedure described in Example XXXIV, 92.3 g. (0.41 m.) of 3-bromobenzotrifluoride, 11.4 g. (0.45 m.) of magnesium and 80.0 g. (0.41 m.) of 2-methyl-7-chloro-4H-3,1-benzoxazin-4-one produce 36 g. (26%) of 5'-chloro-2'-(m-α,α,α-trifluorotoluoyl)acetanilide, M.P. 85–95° C., which is recrystallized from hexane, M.P. 86–8° C. (uncorr.).

Analysis.—Calcd. for $C_{16}H_{11}ClF_3NO_2$ (percent): C, 56.24; H, 3.24; N, 4.10. Found (percent): C, 56.16; H, 3.01; N, 3.91.

Following the procedure described in Example XXXIV, 21.5 g. (0.063 m.) of 5'-chloro-2'-(m-α,α,α-trifluorotoluoyl)acetanilide are hydrolyzed to give 18 g., M.P. 85–90° C., of 2-amino-4-chloro-3'-trifluoromethylbenzophenone. Recrystallization of the product from hexane affords a crystalline solid, M.P. 94–6° C. (uncorr.).

Analysis.—Calcd. for $C_{14}H_9ClF_3NO$ (percent): C, 56.10; H, 3.02; N, 4.67. Found (percent): C, 56.17; H, 2.93; N, 4.49.

2 - amino - 4 - chloro - 3' - trifluoromethylbenzophenone (5.0 g., 0.0167 m.) and 2,2,6,6,-tetramethyl-4-piperidone hydrochloride (3.2 g., 0.0167 m.) are allowed to react in a manner similar to Example XIV. The solution is poured into ice water and sodium hydroxide added to adjust the pH to 7. The insoluble product is filtered and recrystallized twice from a dimethylformamide-water mixture giving m-(7-chloro-1,2,3,4-tetrahydro-1,1,3,3-tetramethylbenzo[b][1,6]naphthyridin-10-yl)benzoic acid as a crystalline solid, M.P. >310° C. (uncorr).

Analysis.—Calcd. for $C_{23}H_{23}ClN_2O_2$ (percent): C, 70.01; H, 5.87; N, 7.09. Found (percent): C, 69.73; H, 5.58; N, 7.20.

Example XXXVII

Following the procedure described in Example XXXIV, reacting 15.0 g. (0.095 m.) of bromobenzene, 2.47 g. (0.1 m.) of magnesium and 15.0 g. (0.077 m.) of 2-methyl-7-chloro-4H-3,1-benzoxazin-4-one produces a yellow oil. Trituration with a 20% cyclohexane-hexane solution gives 3.1 g. (15% yield) of 5'-chloro-2'-benzoylacetanilide. Recrystallization of the product from cyclohexane affords a crystalline solid, M.P. 88–90° C. (uncorr.).

Analysis.—Calcd. for $C_{15}H_{12}ClNO_2$ (percent): C, 65.82; H, 4.42; N, 5.11. Found (percent): C, 65.79; H, 4.45; N, 5.23.

The above compound is also prepared by an alternate procedure. To a same quantity of the Grignard reagent as prepared above is added in five minutes, 7.3 g. (0.04 m.) of anhydrous cadmium chloride and the solution is refluxed for 20 minutes. The diethyl ether is distilled, replaced with 75 ml. of dry benzene and an additional 15 ml. of the solution is distilled. This slurry is added in thirty minutes to a solution of 15.0 g. (0.077 m.) of 2-methyl-7-chloro-4H-3,1-benzoxazin-4-one in 150 ml. of benzene, and then refluxed for forty-five minutes. After cooling to 20° C., the complex is decomposed by the slow addition of 100 ml. of 2 N hydrochloric acid. The resulting solid requires fine crushing before extraction with benzene and dilute hydrochloric acid. The organic layer is separated, washed with dilute aqueous sodium hydroxide, water, dried over anhydrous sodium sulfate and concentrated to dryness in vacuo. The residue is triturated with a 20% cyclohexane-hexane solution to give 8.3 g. (39% yield) of 5'-chloro-2'-benzoylacetanilide. Recrystallization of the product from cyclohexane affords a crystalline solid, M.P. 88–9° C. (uncorr.).

Following the procedure described in Example XXXIV, 5'-chloro-2'-benzoylacetanilide is hydrolyzed to give 2-amino-4-chlorobenzophenone, M.P. 84–5° C.

2-amino-4-chlorobenzophenone (5.0 g., 0.0215 m.) is allowed to react with 1-benzyl-4-piperidone (4.25 g., 0.0225 m.) in a manner similar to Example XXXV, Extraction of the free base with hexane gives 4.0 g. (48%) of the compound as a crystalline solid. Two recrystallizations from cyclohexane affords 2-benzyl-7-chloro-1,2,3,4-tetrahydro - 10-phenylbenzo[b][1,6]naphthyridine, M.P. 142–3° C. (uncorr.).

Analysis.—Calcd. for $C_{25}H_{21}ClN_2$ (percent): C, 78.01; H, 5.50; N, 7.28. Found (percent): C, 77.60; H, 5.28; N, 7.05.

EXAMPLE XXXVIII

A mixture of 3.5 g. (0.01 m.) of 8-chloro-1,2,3,4-tetrahydro - 1,1,3,3 - tetramethyl - 10 - phenylbenzo[b][1,6]naphthyridine, 9.45 ml. (0.025 m.) of formic acid, 0.083 ml. (0.011 m.) of formalin and 75 ml. of isopropyl alcohol is refluxed for eight hours. The solution is acidified with 2.5 ml. of 12 N hydrochloric acid, evaporated, the solid residue dissolved in water, the solution made alkaline and extracted with a 5:95-benzene:diethyl ether mixture. The organic solvent is evaporated and the residue recrystallized from hexane giving 8-chloro-1,2,3,4-tetrahydro-1,1,3,3 - pentamethyl - 10-phenylbenzo[b][1,6]naphthyridine as a crystalline solid, M.P. 175–6° C. (uncorr.).

Analysis.—Calcd. for $C_{23}H_{25}ClN_2$ (percent): C, 75.70; H, 6.90; N, 7.68. Found (percent): C, 75.81; H, 6.58; N, 7.63.

EXAMPLE XXXIX 2-aminobenzophenone (6.0 g., 0.0305 m.), 1-(β-phenethyl)-4-piperidone (6.2 g., 0.0305 m.), 0.3 ml. of trifluoroacetic and 18 ml. of toluene are refluxed for twelve hours over a Dean-Stark trap. The solution is evaporated and the residue extracted with hot hexane. Evaporation of the solvent followed by trituration with diethyl ether gives a solid. Recrystallization from diethyl ether affords 1,2,3,4 - tetrahydro-2-phenethyl-10-phenylbenzo[b][1,6] naphthyridine as a crystalline solid, M.P. 113–4° C. (uncorr.).

Analysis.—Calcd. for $C_{26}H_{24}N_2$ (percent): C, 85.67; H, 6.64; N, 7.69. Found (percent): C, 86.31; H, 6.56; N, 7.80.

EXAMPLE XL

A mixture of 6.0 g. (0.0305 m.) of 2-aminobenzophenone, 5.77 g. (0.0305 m.) of 1-benzyl-4-piperidone and 40 ml. of glacial acetic acid is refluxed for four hours. The solution is evaporated under vacuum and the residue is dissolved in methylene chloride which is extracted with a 20% aqueous potassium hydroxide solution. The methylene chloride solution is washed with water, dried over anhydrous sodium sulfate and evaporated giving the crude product. Trituration of the free base with hexane gives 9.5 g. (87%) of a solid. Recrystallization from cyclohexane gives 2-benzyl-1,2,3,4-tetrahydro-10-phenylbenzo[b][1,6]naphthyridine as a crystalline solid, M.P. 158–9° C. (uncorr.).

Analyses.—Calcd. for $C_{25}H_{22}N_2$ (percent): C, 85.69; H, 6.33; N, 8.00. Found (percent): C, 85.92; H, 6.13; N, 7.93.

EXAMPLE XLI

8 - chloro - 1,2,3,4 - tetrahydro - 2 - methyl - 10 - phenylbenzo[b][1,6]naphthyridin (5.0 g., 0.017 m.), 2.37 g. (0.017 m.) of 5,5-dimethyl-1,3-cyclohexanedione, 0.05 ml. of trifluoroacetic and 100 ml. of benzene is refluxed for two hours over a Dean-Stark trap. The solution is evaporated and the residue crystallized from hot cyclohexane. Recrystallization from benzene affords 3-(8-chloro-1,2,3, 4 - tetrahydro-10-phenylbenzo[b][1,6]naphthyridin-2-yl-5,5-dimethyl-2-cyclohexen-1-one as a crystalline solid, M.P. 114–150° C. (uncorr.).

*Analysis.*—Calcd. for $C_{26}H_{25}ClN_2O$ (percent): C, 74.88; H, 6.04; N, 6.73. Found (percent): C, 74.82; H, 6.00; N, 6.70.

EXAMPLE XLII

A solution of 4.5 g. (0.0266 m.) of 2-amino-4,5-dimethoxybenzaldehyde, 3.0 g. (0.0266 m.) of 1-methyl-4-piperidone, 15 ml. of an aqueous 10% sodium hydroxide solution and 200 ml. of absolute ethanol is allowed to stir for six days at 25° C. The solution is filtered and hydrogen chloride gas and 500 ml. of diethyl ether are added. The hydroscopic salt is dissolved in water, treated with charcoal, filtered and the filtrate made alkaline. The product is filtered, extracted with diethyl ether and recrystallized from water giving 1,2,3,4-tetrahydro-7,8-dimethoxy-10-phenylbenzo[b][1,6]naphthyridine as a crystalline solid.

EXAMPLE XLIII

A solution of 7-chloro-1,2,3,4-tetrahydro-1,1,3,3-tetramethyl - 10 - (p-methylthiophenyl)benzo[b][1,6]naphthyridine (0.0156 m.) in glacial acetic acid (100 ml.) containing platinum oxide (0.3 g.) is hydrogenated at room temperature, and an initial hydrogen pressure of 46.5 p.s.i. for a period of twenty-four hours. The excess acetic acid is distilled in vacuo, the residue dissolved in water, and then basified whereupon the crude product separates. Recrystallization from cyclohexane-hexane affords 7-chloro-1,2,3,4,4a,5,10,10a - octahydro-1,1,3,3-tetramethyl-10 - (p - methylthiophenyl)benzo[b][1,6]naphthyridine.

When the above procedure is repeated employing the compounds of Examples XXXV–XLII, the following products are obtained:

10-(p-ethylthiophenyl)-1,2,3,4,4a,5,10,10a-octahydro-1,1,3,3-tetramethylbenzo[b][1,6]naphthyridine;
10-(m-butylthiophenyl)-1,2,3,4,4a,5,10,10a-octahydro-7-methylbenzo[b][1,6]naphthyridine;
m-(7-chloro-1,2,3,4,4a,5,10,10a-octahydro-1,1,3,3-tetramethylbenzo[b][1,6]naphthyridin-10-yl)benzoic acid;
2-benzyl-7-chloro-1,2,3,4,4a,5,10,10a-octahydro-10-phenylbenzo[b][1,6]naphthyridine;
8-chloro-1,2,3,4,4a,5,10,10a-octahydro-1,1,2,3,3-pentamethyl-10-phenylbenzo[b][1,6]naphthyridine;
1,2,3,4,4a,5,10,10a-octahydro-2-phenethyl-10-phenyl-benzo[b][1,6]naphthyridine;
2-benzyl-1,2,3,4,4a,5,10,10a-octahydro-10-phenylbenzo[b][1,6]naphthyridine;
3-(8-chloro-1,2,3,4,4a,5,10,10a-octahydro-10-phenyl-benzo[b][1,6]naphthyridin-2-yl)-5,5-dimethylcyclohexan-1-one; and
1,2,3,4,4a,5,10,10a-octahydro-7,8-dimethoxy-10-phenyl-benzo[b][1,6]naphthyridine.

EXAMPLE XLIV

A mixture of 2-aminobenzonitrile (5.00 g., 0.0423 m.) and 1-methyl-4-piperidone (4.80 g., 0.0423 m.) in polyphosphoric acid (105 g.) is gradually heated to 140–150° C., and maintained at this temperature for one hour. The dark amber reaction mixture is poured with vigorous stirring into cold water (800 ml.). The resultant clear amber solution is decolorized, filtered through Celite, and the clear filtrate basified with 45% KOH (pH ca. 10). An oil separates which slowly crystallizes. It is collected by filtration, washed with water, air-dried; yield is 1.50 g. (16.7%), M.P. 82.5° C. (uncorr.). The filtrate is extracted with ether (6× 200 ml.) and the combined extracts successively washed with water, saturated salt solution, filtered through anhydrous sodium sulfate, and the filtrate concentrated in vacuo giving an oil which crystallizes on trituration with pentane; yield is 0.35 g. (3.9%) M.P. 84° C. (uncorr.). Total yield of crude product is 1.85 g. (20.6%) which is directly converted to the dihydrochloride by saturating a tetrahydrofuran solution with dry hydrogen chloride; colorless crystals (1.90 g.), M.P. 301° C. dec. (uncorr.). Recrystallization of the crude dihydrochloride from 80% ethanol affords colorless crystals of the desired 10-amino-1,2,3,4-tetrahydro-2-methylbenzo[b][1,6]naphthyridine dihydrochloride (1.10 g.) M.P. 321–322° C. dec. (uncorr.).

*Analysis.*—Calcd. for $C_{13}H_{17}Cl_2N_3$ (percent): C, 54.55; H, 5.85; Cl, 24.78; N, 14.68. Found (percent): C, 54.73; H, 5.85; Cl, 24.2; N, 14.79.

In a similar manner, 10-amino-2-ethyl-1,2,3,4-tetrahydro-8-methylbenzo[b][1,6]naphthyridine and 10-amino-1-benzyl-1,2,3,4 - tetrahydro - 2 - methylbenzo[b][1,6]naphthyridine are produced.

EXAMPLE XLV

A mixture of 2-amino-4-chlorobenzonitrile (2.5 g.) and 1-benzyl-4-piperidone (2.5 g.) in trifluoroacetic acid (100 g.) is gradually heated to reflux, and maintained at this temperature for one hour. The reaction mixture is then poured into cold water (500 ml.). The resultant solution is filtered, and the filtrate basified with 1 N solution hydroxide. The crude product is collected by filtration and washed with water to yield the desired 10-amino-2-benzyl-7-chloro-1,2,3,4 - tetrahydrobenzo[b][1,6]naphthyridine.

Dry hydrogen chloride is passed into an ether solution of the above prepared 10-amino-2-benzyl-7-chloro-1,2,3,4-tetrahyrobenzo[b][1,6]naphthyridine. Thereafter, the resulting dihydrochloric salt is recrystallized from absolute ethanol to yield colorless crystals thereof.

EXAMPLE XLVI

A mixture of 2-amino-3-chloro-benzonitrile (1.0 g.) and 1-phenethyl-4-piperidone (1.0 g.) in acetic acid (50.0 g.) is heated to reflux for sixteen hours. The reaction mixture is then poured into cold water (200 ml.). The resultant solution is filtered, and the filtrate basified with 1.5 N potassium hydroxide. The crude product is collected by filtration and washed with water to yield the desired 10-amino-6-chloro-1,2,3,4-tetrahydro-2-phenethylbenzo[b][1,6]naphthyridine.

Similarly, 10-amino-2-(p - chlorophenyl)-1,2,3,4-tetrahydro-8-iodobenzo[b][1,6]naphthyridine and 10-amino-2-(p-bromophenyl) - 7 - butyl-1,2,3,4-tetrahydro[b][1,6]naphthyridine are synthesized.

EXAMPLE XLVII

A mixture of 2-amino-4-methylbenzonitrile (10.0 g.) and 1-benzoyl-4-piperidone (10.0 g.) in benzenesulfonic acid (100 g.) is gradually heated to 100° C., and maintained at this temperature for one hour. The reaction mixture is then poured into cold water (1500 ml.). The resultant solution is filtered, and the filtrate basified with 1.5 N sodium hydroxide. The crude product is collected by filtration and washed with water to yield the desired 10-amino-2-benzoyl-1,2,3,4-tetrahydro - 7 - methylbenzo[b][1,6]naphthyridine.

Dry hydrogen chloride gas is passed into a tetrahydrofuran solution of the above prepared 10-amino-2-benzoyl-1,2,3,4-tetrahydro-7 - methylbenzo[b][1,6]naphthyridine. The resulting salt is recrystallized from ethanol to yield a crystalline 10-amino-2-benzoyl-1,2,3,4-tetrahydro-7-methylbenzo[b][1,6]naphthyridine dihydrochloride.

EXAMPLE XLVIII

Additional benzo[b][1,6]naphthylridines having the formula:

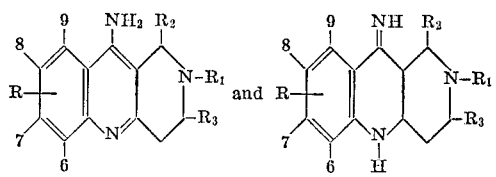

are prepared according to the procedures of the above examples where R, R₁, R₂ and R₃ are defined as follows:

| R | R₂ | R₃ | R₁ |
|---|---|---|---|
| 7-CH₃O | CH₃ | H | CH₃CO |
| 7-CH₃O | H | CH₃ | CH₃CO |
| 8-Br | H | H | CH₃SO₂ |
| 8-Cl | H | CH₃ | C₆H₅SO₂ |
| 6-NO₂ | C₂H₅ | H | C₆H₅ |
| 6-NO₂ | H | C₂H₅ | C₆H₅ |
| 9-C₂H₅ | C₆H₅ | H | CH₃ |
| 9-C₂H₅ | H | C₆H₅ | CH₃ |
| 7-Cl | H | H | (CH₃)₃NCO |
| 8-Br | H | H | CH₃OC₃H₇ |
| 8-C₄H₉O | H | H | p-C₂H₅C₆H₄ |
| 6-Cl | H | p-CH₃C₆H₄ | H |
| 6-Cl | p-CH₃C₆H₄ | H | H |
| 8-I | H | H | (CH₃)₂NC₃H₅ |
| 7-CH₃ | H | C₆H₅ | C₃H₅ |
| 7-CH₃ | C₆H₅ | H | C₃H₅ |
| 8-C₂H₅O | H | H | (C₃H₅)₂NCO |
| 8-NO₂ | H | H | C₃H₇OC₂H₅ |
| 6-CH₃ | H | CH₃OC₆H₄ | CH₃ |
| 6-CH₃ | CH₃OC₆H | H | CH₃ |
| 8-Cl | p-BrC₆H₄ | H | H |
| 8-Cl | H | p-BrC₆H₄ | H |
| 7-Br | H | H | (C₂H₅)₂NC₄H₉ |

EXAMPLE IXL

A mixture of 2-aminobenzonitrile (2.0 g.) and 2,2,6,6-tetramethyl-4-piperidone (2.0 g.) in polyphosphoric acid (75 g.) is gradually heated to 150° C., and maintained at this temperature for one and a half hours. The reaction mixture is then poured into cold water (400 ml.). The resultant solution is filtered, and the filtrate basified with 0.5 N sodium hydroxide. The crude product is collected by filtration and washed with water to yield the desired 10-amino-2-butyl - 1,2,3,4-tetrahydro-1,1,3,3-tetramethylbenzo[b][1,6]naphthyridine.

Similarly, the 10 - amino-2-ethyl - 1,2,3,4-tetrahydro-1,1,3,3 - tetramethylbenzo[b][1,6]naphthyridine and the 10-amino-1,2,3,4 - tetrahydro-1,1,3,3 - tetramethylbenzo[b][1,6]naphthyridine are prepared.

EXAMPLE L

A mixture of 2-aminobenzonitrile (5.0 g.) and 1-ethylsulfonyl-4-piperidone (5.0 g.) in ethylsulfonic acid (150 g.) is gradually heated to 150° C., and maintained at this temperature for two hours. The reaction mixture is then poured into cold water (1200 ml.). The resultant solution is filtered, and the filtrate basified with 45% potassium hydroxide. The crude product is collected by filtration and washed with water to yield the desired 10-amino-2-ethylsulfonyl-1,2,3,4-tetrahydrobenzo[b][1,6]naphthyridine.

The dihydrochloride of the above prepared 10-amino-2-ethylsulfonyl-1,2,3,4-tetrahydrobenzo[b][1,6]naphthyridine is prepared in accord with the procedure of Example XLIV.

EXAMPLE LI

The following benzo[b][1,6]naphthyridines having the formulae:

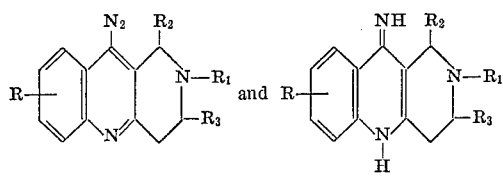

are prepared according to the procedure of the prior examples, employing the appropriate 2-aminobenzonitrile and 4-piperidone compounds as starting materials:

10-amino-8-chloro-1,2,3,4-tetrahydro-1-(p-methoxyphenyl)-2-methylbenzo[b][1,6]naphthyridine;
10-amino-8-chloro-1,2,3,4-tetrahydro-3-(p-methoxyphenyl)-2-methylbenzo[b][1,6]naphthyridine;
10-amino-1,2,3,4-tetrahydro-2-methoxyethyl-3-phenethylbenzo[b][1,6]naphthyridine;
10-amino-1,2,3,4-tetrahydro-2-methoxyethyl-1-phenethylbenzo[b][1,6]naphthyridine;
10-amino-7-ethyl-1,2,3,4-tetrahydro-2-propionylbenzo[b][1,6]naphthyridine;
10-amino-3-butyl-2-diethylcarbamoyl-1,2,3,4-tetrahydrobenzo[b][1,6]naphthyridine;
10-amino-1-butyl-2-diethylcarbamoyl-1,2,3,4-tetrahydrobenzo[b][1,6]naphthyridine;
10-amino-3-(p-bromophenyl)-1,2,3,4-tetrahydrobenzo[b][1,6]naphthyridine;
10-amino-1-(p-bromophenyl)-1,2,3,4-tetrahydrobenzo[b][1,6]naphthyridine; and
10-amino-1,2,3,4-tetrahydro-2-(p-tolyl)benzo[b][1,6]naphthyridine.

EXAMPLE LII

A mixture of 2-aminobenzonitrile (10.0 g.) and 2,6-dimethyl-4-piperidone (10.0 g.) in methylsulfonic acid (120 g.) is gradully heated to 145° C., and maintained at this temperature for two hours. The reaction mixture is then poured in cold water (2000 ml.). The resultant solution is filtered, and the filtrate basified with 1 N sodium hydroxide. The crude product is collected by filtration and washed with water to yield the desired 10-amino-1,2,3,4 - tetrahydro-1,3-dimethylbenzo[b][1,6]naphthyridine.

Employing the above procedure the following compounds are also prepared:

10-amino-3-(p-chlorophenyl)-1,2,3,4-tetrahydro-2-propylbenzo[b][1,6-]naphthyridine;
10-amino-1-(p-chlorophenyl)-1,2,3,4-tetrahydro-2-propylbenzo[b][1,6]naphthyridine;
10-amino-1,2,3,4-tetrahydro-2-methyl-3-(p-propylphenyl)benzo[b][1,6]naphthyridine;
10-amino-1,2,3,4-tetrahydro-2-methyl-1-(p-propylphenyl)benzo[b][1,6]naphthyridine; and
10-amino-1,2,3,4-tetrahydro-8-iodo-2-(m-iodophenyl)benzo[b][1,6]naphthyridine.

EXAMPLE LIII

A solution of 10-amino-1,2,3,4-tetrahydro-2-methylbenzo[b][1,6]naphthyridine dihydrochloride, as prepared in Example XLIV, (0.0156 m.) in glacial acetic acid (100 ml.) containing platinum oxide (0.3 g.) is hydrogenated at room temperature, and an initial hydrogen pressure of 46.5 p.s.i. for a period of twenty-four hours. The excess acetic acid is distilled in vacuo, the residue dissolved in water, and then basified whereupon the crude product separates. Recrystallization from cyclohexane-hexane affords 10-amino-1,2,3,4,4a,5,10,10a-octahydro-2-methylbenzo[b][1,6]naphthyridine.

When the above procedure is repeated for the 10-amino - 1,2,3,4,4a,5,10,10a-octahydrobenzo[b][1,6]naphthyridines of Examples XLV–LII, the corresponding 10-amino - 1,2,3,4,4a,5,10,10a-octahydrobenzo[b][1,6]naphthyridines are obtained.

EXAMPLE LIV 1-methyl-4-piperidone (66.0 g., 0.58 m.) is slowly added to a slurry of 4-chloroanthranilic acid (100.0 g., 0.58 m.) in phosphorous oxychloride (500 ml.) and the resulting mixture refluxed for two hours. The solvent is evaporated and the residue taken up in methylene chloride (2 liters). This is slowly added to a stirred ammonium hydroxide-ice solution (10 liters). The methylene chloride solution is washed with water, dried over anhydrous sodium sulfate and evaporated giving 139.0 g. of a green solid. This solid is extracted with 1.5 l of hexane, treated with charcoal, concentrated and crystallized giving 79.0 g. (49%) of crude product. Recrystallization from hexane gives 7,10 - dichloro-1,2,3,4-tetrahydro-2-methylbenzo[b] [1,6]naphthyridine as a yellow crystalline solid, M.P. 114–5° C. (uncorr.).

Analysis.—Calcd. for $C_{13}H_{12}Cl_2N_2$ (percent): C, 58.46; H, 4.53; N, 10.49. Found (percent): C, 58.63; H, 4.28; N, 10.23.

The above prepared 7,10-dichloro-1,2,3,4-tetrahydro-2-methylbenzo[b][1,6]naphthyridine (5.0 g., 0.018 m.), and 3.36 g. (0.036 m.) of phenol are heated under nitrogen at 100° C. for fifteen minutes until a clear melt is obtained. Aniline (3.3 ml. 0.036 m.) is then added dropwise with stirring and the mixture is heated at 135–140° C. for five hours. The reaction product is dissolved in methylene chloride and extracted with a 20% potassium hydroxide solution. After being dried over anhydrous sodium sulfate, the methylene chloride solution is evaporated giving the free base. This product is triturated with ethyl acetate and recrystallized twice from acetonitrile giving 4.0 g. (69%) of 10-anilino-7-chloro-1,2,3,4-tetrahydro-2-methylbenzo[b][1,6]naphthyridine as a crystalline solid, M.P. 197–8° C. (red melt) (uncorr.).

Analysis.—Calcd. for $C_{19}H_{18}ClN_3$ (percent): C, 70.47; H, 5.60; N, 12.98. Found (percent): C, 70.40; H, 5.40; N, 12.72.

In a similar manner, the following compounds are prepared:

7,10-dichloro-1,2,3,4-tetrahydro-2-methylbenzo[b][1,6] naphthyridine (5.0 g., 0.018 m.) and phenol (3.38 g., 0.036 m.) are reacted to form the free base which is recrystallized three times from hexane to yield 7-chloro-1,2,3,4 - tetrahydro - 2-methyl-10-phenoxybenzo[b][1,6] naphthyridine as a crystalline solid, M.P. 138–9° C. (uncorr.).

Analysis.—Calcd. for $C_{19}H_{17}ClN_2O$ (percent): C, 70.25; H, 5.27; N, 8.64. Found (percent): C, 70.50; H, 4.91; N, 8.87.

7,10-dichloro-1,2,3,4-tetrahydro-2-methylbenzo[b][1,6] naphthyridine (8.0 g., 0.03 m.), 5.65 g. (0.06 m.) of phenol and 7.0 g. (0.07 m.) of N-methylpiperazine are reacted to form the free base which is triturated with pentane and recrystallized from hexane giving 7-chloro-1,2,3,4 - tetrahydro-2-methyl-10-(4-methyl-1-piperazinyl) benzo[b][1,6]naphthyridine as a crystalline solid, M.P. 114–5° C. (uncorr.).

Analysis.—Calcd. for $C_{18}H_{23}ClN_4$ (percent): C, 65.33; H, 7.02; N, 16.94. Found (percent): C, 65.74; H, 6.97; N, 16.79.

7,10 - dichloro - 1,2,3,4 - tetrahydro-2-methylbenzo[b] [1,6]naphthyridine (10.0 g., 0.0375 m.), 7.05 g. (0.075 m.) of phenol and 8.1 g. (0.075 m.) of o-phenylenediamine are reacted to form the free base which is triturated with carbon tetrachloride and recrystallized twice from methanol giving 10-(o-aminoanilino)-7-chloro-1,2,3,4,- tetrahydro-2-methylbenzo[b][1,6]naphthyridine as a crystalline solid M.P. 189–192° C. (uncorr.).

Analysis.—Calcd. for $C_{19}H_{19}ClN_4$ (percent): C, 67.35; H, 5.65; N, 16.54. Found (percent): C, 67.23; H, 5.79; N, 16.39.

When the above products are hydrogenated by the process of Example LIII, the following compounds are obtained:

10-anilino-7-chloro-1,2,3,4,4a,5,10,10a-octahydro-2-methylbenzo[b][1,6]naphthyridine;
7-chloro-1,2,3,4,4a,5,10,10a-octahydro-2-methyl-10-phenoxybenzo[b][1,6]naphthyridine;
7-chloro-1,2,3,4,4a,5,10,10a-octahydro-2-methyl-10-(4-methyl-1-piperazinyl)benzo[b][1,6]naphthyridine; and
10-(o-aminoanilino)-7-chloro-1,2,3,4,4a5,10,10a-octahydro-2-methylbenzo[b][1,6]naphthyridine.

EXAMPLE LV 1-methyl-4-piperidone (130.0 g., 1.15 m.) 5-chloro anthranilic acid (200.0 g., 1.16 m.) and phosphorous oxychloride (800 ml.) are allowed to react in a manner similar to Example LIV. The crude product is extracted several times with hot hexane. The combined extracts are concentrated and the product allowed to crystallize giving 140 g. (45%) of solid. Recrystallization of the crude product from hexane gives 8,10-dichloro-1,2,3,4-tetrahydro-2-methylbenzo[b][1,6]naphthyridine as a crystalline solid, M.P. 88–9° C. (uncorr.).

Analysis.—Calcd. for $C_{13}H_{12}Cl_2N_2$ (percent): C, 58.46; H, 4.53; N, 10.49. Found (percent): C, 58.51; H, 4.31; N, 10.38.

The above-prepared 8,10-dichloro-1,2,3,4-tetrahydro-2-methylbenzo[b][1,6]naphthyridine (5.0 g., 0.018 m.) and phenol (3.38 g., 0.036 m.) are reacted as described in the second paragraph of Example LIV to obtain the free base which is recrystallized three times from hexane to afford 8 - chloro - 1,2,3,4-tetrahydro-2-methyl-10-phenoxybenzo [b][1,6]naphthyridine as a crystalline solid, M.P. 182–4° C. (uncorr.).

Analysis.—Calcd. for $C_{19}H_{17}ClN_2O$ (percent): C, 70.25; H, 5.27; N, 8.64; Cl, 10.91. Found (percent) C, 70.39; H, 5.07; N, 8.77; Cl, 10.89.

In the same manner, the following compounds are prepared:

8,10 - dichloro - 1,2,3,4 - tetrahydro-2-methylbenzo[b] [1,6]naphthyridine (15.0 g., 0.0562 m.), 10.6 g. (0.115 m.) of phenol and 10.3 ml. (0.115 m.) of aniline are reacted. Thereafter the reaction mixture is slurried with a mixture of 10% aqueous potassium hydroxide and diethyl ether. The insoluble product is filtered and recrystallized from acetonitrile giving 10-anilino-8-chloro-1,2,3,4-tetrahydro-2-methylbenzo[b][1,6]naphthyridine as a crystalline solid (13.0 g., 72%), M.P. 187–9° C. (red melt) (uncorr.).

Analysis.—Calcd. for $C_{19}H_{18}ClN_3$ (percent): C, 70.47; H, 5.60; N, 12.98. Found (percent): C, 70.51; H, 5.40; N, 13.14.

8,10 - dichloro - 1,2,3,4-tetrahydro-2-methylbenzo[b] [1,6]naphthyridine (8.0 g., 0.03 m.), 5.65 g. (0.06 m.) of phenol and 6.1 g. (0.06 m.) of dimethylaminopropylamine are reacted and the resulting free base is then recrystallized from cyclohexane followed by trituration with hexane to afford 8-chloro-1,2,3,4-tetrahydro-2-methyl-10-[(3 - dimethylaminopropyl)amino]benzo[b] [1,6]naphthyridine as a crystalline solid, (5.0 g., 50%) M.P. 107–8° C. (uncorr.).

Analysis.—Calcd. for $C_{18}H_{25}ClN_4$ (percent):C. 64.94; H, 7.57 N, 16.83. Found (percent): C, 65.23; H, 7.86; N, 16.84.

EXAMPLE LVI 5-methoxyanthranilic acid (10.0 g., 0.0598 m.), 1-methyl-4-piperidone (13.5 g., 0.112 m.) and phosphorous oxychloride (150 ml.) are allowed to react in a manner similar to Example LIV. The crude product is extracted several times with hot cyclohexane. The combined extracts are concentrated and the product allowed to crystallize. Recrystallization of the crude product from the same solvent gives 10-chloro-1,2,3,4-tetrahydro-8-methoxy-2-methylbenzo[b][1,6]naphthyridine (4.0 g., 25%), M.P. 126–7° C. (uncorr.)

Analysis.—Calcd. for $C_{14}H_{15}ClN_2O$ (percent): C, 64.00; H, 5.76; N, 10.66. Found (percent): C, 64.07; H, 5.46; N, 10.57.

When the above prepared naphthyridine is reacted with dimethylaminoethylamine by the procedure of the second paragraph of Example LIV, there is obtained 1,2,3,4-tetrahydro - 8-methoxy-2-methyl-10-[(2-dimethylaminoethyl) amino]benzo[b][1,6]naphthyridine.

Similarly, the following products are obtained:

1,2,3,4-tetrahydro-8-methoxy-2-methyl-10-[(4-dipropylaminobutyl)amino]benzo[b][1,6]naphthyridine;

10-(4-ethyl-1-piperazinyl)-1,2,3,4-tetrahydro-8-methoxy-2-methylbenzo[b][1,6]naphthyridine;

10-[(3-diethylaminopropyl)amino]-1,2,3,4-tetrahydro-8-methoxy-2-methylbenzo[b][1,6]naphthyridine; and 10-(4-butyl-1-piperazinyl)-1,2,3,4-tetrahydro-8-methoxy-2-methylbenzo[b][1,6]naphthyridine.

EXAMPLE LVII 10-chloro-1,2,3,4-tetrahydro-2-methyl-8-nitrobenzo[b][1,6]naphthyridine (5.0 g., 0.018 m.) and phenol (3.38 g., 0.036 m.) is heated under nitrogen at 100° C. for fifteen minutes until a clear melt is obtained. Morpholine (3.50 ml., 0.040 m.) is then added dropwise with stirring and the mixture is heated at 135–140° C. for five hours. The reaction product is dissolved in methylene chloride and extracted with a 20% potassium hydroxide solution. After being dried over anhydrous sodium sulfate, the methylene chloride solution is evaporated giving the free base. This product is triturated with ethyl acetate and recrystallized from benzene giving 1,2,3,4-tetrahydro-2-methyl-10-morpholino-8-nitrobenzo[b][1,6]naphthyridine as a crystalline solid, M.P. 216–7° C. (uncorr.).

*Analysis.*—Calcd. for $C_{17}H_{20}N_4O_3$ (percent): C, 62.17; H, 6.14; N, 17.06. Found (percent): C, 61.99; H, 5.92; N, 16.98.

EXAMPLE LVIII

A solution of 5.0 g. (0.018 m.) of 7,10-dichloro-1,2,3,4-tetrahydro-2-methylbenzo[b][1,6]naphthyridine, 2.03 ml. (0.02 m.) of thiophenol, 1 ml. of concentrated hydrochloric acid and 300 ml. of 95% absolute ethanol is refluxed for four hours. After evaporation of the solution the residue is dissolved in methylene chloride and extracted with a 20% aqueous sodium carbonate solution. After being dried over anhydrous sodium sulfate the methylene chloride is evaporated and the residue is triturated with hexane. The crude product (5.2 g., 85%) is recrystallized twice from acetonitrile to give 7-chloro-1,2,3,4-tetrahydro-2-methyl-10-phenthiobenzo[b][1,6]naphthyridine, M.P. 131–2° C. (uncorr.).

*Analysis.*—Calcd. for $C_{19}H_{17}ClN_2S$ (percent): C, 66.94; H, 5.03; N, 8.22. Found (percent): C, 67.21; H, 4.73; N, 8.11.

EXAMPLE LIX

A solution of 5.0 g. (0.0188 m.) of 8,10-dichloro-1,2,3,4-tetrahydro-2-methylbenzo[b][1,6]naphthyridine, 3.3 g. (0.0244 m.) of 3-aminopropanethiol hydrochloride, 15 ml. of 18.5% aqueous potassium hydroxide (0.05 m.) and 30 ml. of absolute ethanol is refluxed for one and a half hours. After evaporation of the solution the residue is dissolved in methylene chloride and extracted with water. Evaporation of the methylene chloride solution gives the free base. Recrystallization of the product from hexane affords 10-(3-aminopropylthio)-8-chloro-1,2,3,4-tetrahydro-2-methylbenzo[b][1,6]naphthyridine as a crystalline solid (3.2 g., 53%), M.P. 87–89° C. (uncorr.).

*Analysis.*—Calcd. for $C_{16}H_{20}ClN_3S$ (percent): C, 59.70; H, 6.26; N, 13.05; S, 9.96. Found (percent): C, 60.27; H, 6.40; N, 13.02; S, 9.95.

EXAMPLE LX

A solution of 4.0 g. (0.015 m.) of 7,10-dichloro-1,2,3,4-tetrahydro-2-methylbenzo[b][1,6]naphthyridine, 3.2 ml. (0.03 m.) of phenylhydrazine, 2.5 ml. of concentrated hydrochloric acid and 150 ml. of absolute ethanol is refluxed for six hours. After cooling the solution, a yellow solid is filtered which is then dissolved in methanol. To this solution is slowly added an aqueous sodium carbonate solution thereby effecting the precipitation of the free base. Two recrystallization of the product from benzene gives 1-(7-chloro-1,2,3,4-tetrahydro-2-methylbenzo[b][1,6]naphthyrin-10-yl)-2-phenylhydrazine as a crystalline solid, M.P. 176–8° C. (decomp.) (uncorr.).

*Analysis.*—Calcd. for $C_{19}H_{19}ClN_4$ (percent): C, 67.35; H, 5.65; N, 16.54. Found (percent): C, 67.76; H, 5.43; N, 16.12.

EXAMPLE LXI

A solution of 5.0 g. (0.0187 m.) of 8,10-dichloro-1,2,3,4-tetrahydro-2-methylbenzo[b][1,6]naphthyridine, 3.5 g. (0.074 m.) of 95% hydrazine and 50 ml. of n-propyl alcohol is refluxed for four hours. The solution is evaporated and the residue treated simultaneously with methylene chloride and a sodium carbonate solution leaving an insoluble solid (2.0 g., 41%). Recrystallization of the product from benzene affords (8-chloro-1,2,3,4-tetrahydro-2-methylbenzo[b][1,6]naphthyridin-10-yl)hydrazine as a crystalline solid, M.P. 172–3° C. (uncorr.).

*Analysis.*—Calcd. for $C_{13}H_{15}ClN_4$ (percent): C, 59.44; H, 5.75; N, 21.33. Found (percent): C, 59.20; H, 5.66; N, 21.31.

EXAMPLE LXII

A solution of 8-chloro-1,2,3,4-tetrahydro-2-methyl-10-phenoxybenzo[b][1,6]naphthyridine (0.0312 m.) in glacial acetic acid (200 ml.) containing platinum oxide (0.6 g.) is hydrogenated at room temperature, and an initial hydrogen pressure of 46.5 p.s.i. for a period of twenty-four hours. The excess acetic acid is distilled in vacuo, the residue dissolved in water, and then basified whereupon the crude product separates. Recrystallization from cyclohexane-hexane affords 8-chloro-1,2,3,4-4a,5,10,10a-octahydro-2-methyl-10-phenoxybenzo[b][1,6]naphthyridine.

When the above procedure is repeated using the products of Example LV–LXI as reactants, the following corresponding hydrogenated compounds are obtained:

10-anilino-8-chloro-1,2,3,4,4a,5,10,10a-octahydro-2-methylbenzo[b][1,6]naphthyridine;

8-chloro-1,2,3,4,4a,5,10,10a-octahydro-2-methyl-10-[(3-dimethylaminopropyl)amino]benzo[b][1,6]naphthyridine;

1,2,3,4,4a,5,10,10a-octahydro-8-methoxy-2-methyl-10-[(2-dimethylaminoethyl)amino]benzo[b][1,6]naphthyridine;

1,2,3,4,4a,5,10,10a-octahydro-8-methoxy-2-methyl-10-[4-dipropylaminobutyl)amino]benzo[b][1,6]naphthyridine;

10-(4-ethyl-1-piperazinyl)-1,2,3,4,4a,5,10,10a-octahydro-8-methoxy-2-methylbenzo[b][1,6]naphthyridine;

10-[(3-diethylaminopropyl)amino]-1,2,3,4,4a,5,10,10a-octahydro-8-methoxy-2-methylbenzo[b][1,6]naphthyridine;

10-(4-butyl-1-piperazinyl)-1,2,3,4,4a,5,10,10a-octahydro-8-methoxy-2-methylbenzo[b][1,6]naphthyridine;

8-amino-1,2,3,4,4a,5,10,10a-octahydro-2-methyl-10-morpholinobenzo[b][1,6]naphthyridine;

7-chloro-1,2,3,4,4a,5,10,10a-octahydro-2-methyl-10-phenthiobenzo[b][1,6]naphthyridine, 10-(3-aminopropylthio)-8-chloro-1,2,3,4,4a,5,10,10a-octahydro-2-methylbenzo[b][1,6]naphthyridine;

1-(7-chloro-1,2,3,4,4a,5,10,10a-octahydro-2-methylbenzo[b][1,6]naphthyridin-10-yl)-2-phenylhydrazine; and (8-chloro-1,2,3,4,4a,5,10,10a-octahydro-2-methylbenzo[b][1,6]naphthyridin-10-yl)hydrazine.

EXAMPLE LXIII

An ethanolic solution of 2-benzyl-8-chloro-1,2,3,4-tetrahydro-10-phenylbenzo[b][1,6]naphthyridine hydrochloride (10.0 g., 0.0238 m.) is hydrogenated at three atmospheres of $H_2$ pressure in the presence of a palladium catalyst, for thirty hours then at 60° C. for twenty hours. A total of 0.051 moles of hydrogen is consumed during this period. After separation of the catalyst by filtration, the solvent is distilled in vacuo and the solid residue recrystallized from absolute ethanol to yield colorless crystals of 1,2,3,4-tetrahydro - 10 - phenylbenzo[b][1,6]naphthyridine dihydrochloride, M.P. 276.5–277° C. (uncorr.).

*Analysis.*—Calcd. for $C_{18}H_{18}Cl_2N_2$ (percent): C, 64.85; H, 5.45; Cl, 21.29; N, 8.41. Found (percent): C, 64.58; H, 5.35; Cl, 21.0; N, 8.18.

EXAMPLE LXIV

The citrate salt of 8-chloro-1,2,3,4-tetrahydro-2-methyl-10-phenylbenzo[b][1,6]naphthyridine is prepared by admixing an ethanolic solution of the compound with an aqueous solution containing two molar equivalents of citric acid and, thereafter evaporating the co-solvents under vacuum.

Other acid addition salts of the 1,2,3,4-tetrahydrobenzonaphthyridine and 1,2,3,4,4a,5,10,10a-octahydrobenzonaphthyridine compounds described in the above examples are prepared by similar procedures employing hydrobromic acid, hydroiodic acid, nitric acid, sulfuric acid, phosphoric acid, tartaric acid, acetic acid, succinic acid, maleic acid and gluconic acid.

What is claimed is:

1. A compound selected from the group consisting of those having the formulae:

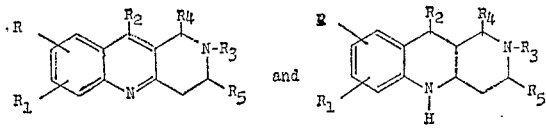

(I) and (II)

wherein R is hydrogen and $R_1$ is selected from the group consisting of hydrogen, halogen; lower alkyl and lower alkoxy, $R_2$ is selected from the group consisting of sulfamylphenyl and carboxyphenyl; and $R_3$ is selected from the group consisting of hydrogen, lower alkyl, di(lower) straight chain alkyl, halophenyl, phen(lower)alkyl, benzoyl, lower alkanoyl, halo(lower) alkanoyl, dihalo(lower)alkanoyl, lower alkanoyloxy, di(lower)alkylamino(lower) alkanoyl, lower alkylsulfonyl, phenylsulfonyl, lower alkoxy(lower)alkyl, lower alkoxycarbonyl and di(lower)alkylamino(lower)alkyl, $R_4$ and $R_5$ are both selected from the group consisting of hydrogen, dimethyl, lower straight chain alkyl, lower alkylphenyl, and lower alkoxyphenyl, and the pharmacologically acceptable acid addition salts thereof wherein said (lower)alkyl or (lower)alkyl portion of (lower)alkoxy or (lower)alkanoyl is from one to six carbon atoms.

2. The compound as defined in claim 1 Formula I wherein R, $R_4$ and $R_5$ are hydrogen; $R_1$ is chloro fixed in the 8-position; $R_2$ is m-sulfamoylphenyl; $R_3$ is benzyl which is: m-(2-benzyl-8-chloro - 1,2,3,4 - tetrahydro-10-benzo[b][1,6]naphthridine-10-yl)benzenesulfonamide.

3. The compound as defined in claim 1 Formula I wherein R and $R_3$ are hydrogen; $R_1$ is chloro fixed in the 7-position; $R_2$ is m-carboxyphenyl; and $R_4$ and $R_5$ are dimethyl which is: m-(7-chloro-1,2,3,4-tetrahydro-1,1,3,3-tetramethylbenzo[b][1,6]naphthyridin - 10 - yl)benzoic acid.

4. A compound selected from the group consisting of those having the formulae:

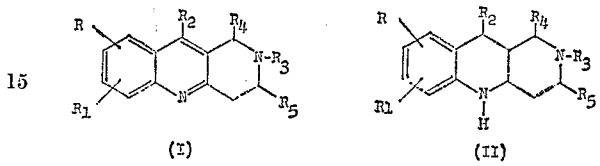

(I) and (II)

wherein R and $R_1$ are selected from the group consisting of hydrogen, halogen, lower alkyl and lower alkoxy, $R_2$ is selected from the group consisting of hydrazino, amino, aminoanilino, anilino, di(lower)alkylamino(lower)alkylamino, phenyl, phenylhydrazino, halophenyl, lower alkoxyphenyl, phenoxy, morpholino and 4-(lower)alkylpiperazino; and $R_3$ is lower alkoxycarbonyl; $R_4$ and $R_5$ are both selected from the group consisting of hydrogen, dimethyl, lower straight chain alkyl, lower alkylphenyl and lower alkoxyphenyl; and the pharmacologically acceptable acid addition salts thereof wherein said (lower) alkyl and (lower)alkyl portion of (lower)alkoxy are from one to six carbon atoms.

5. The compound as defined in claim 4 Formula I wherein R, $R_4$ and $R_5$ are hydrogen; $R_1$ is chloro fixed in the 8-position; $R_2$ is phenyl; and $R_3$ is ethoxycarbonyl which is: 8-chloro-2-ethoxycarbonyl-1,2,3,4-tetrahydro-10-phenylbenzo[b][1,6]naphthyridine.

References Cited

UNITED STATES PATENTS

| | | | |
|---|---|---|---|
| 3,401,201 | 9/1968 | Walton | 260—288 X |
| 3,503,981 | 3/1970 | Suess et al. | 260—288 |

OTHER REFERENCES

Chem. Abstracts, vol. 60, col. 8005–6 (1964).
Kempter et al., Chem. Ber., vol. 98, pp. 419–27 (1965).
Chem. Abstr., vol. 70, col. 96780y, Abstracting, France, 1514010.

DONALD G. DAUS, Primary Examiner

U.S. Cl. X.R.

260—283.8, 288 R